US008084383B2

(12) United States Patent
Hu et al.

(10) Patent No.: US 8,084,383 B2
(45) Date of Patent: Dec. 27, 2011

(54) GASOLINE SULFUR REDUCTION CATALYST FOR FLUID CATALYTIC CRACKING PROCESS

(75) Inventors: Ruizhong Hu, Woodstock, MD (US); Xinjin Zhao, Woodbine, MD (US); Richard Franklin Wormsbecher, Dayton, MD (US); Michael Scott Ziebarth, Columbia, MD (US)

(73) Assignee: W.R. Grace & Co.-Conn., Columbia, MD (US)

( * ) Notice: Subject to any disclaimer, the term of this patent is extended or adjusted under 35 U.S.C. 154(b) by 1204 days.

(21) Appl. No.: 10/801,424

(22) Filed: Mar. 16, 2004

(65) Prior Publication Data

US 2005/0205464 A1   Sep. 22, 2005

(51) Int. Cl.
  *B01J 29/70*    (2006.01)
  *B01J 29/064*   (2006.01)
  *B01J 29/068*   (2006.01)
  *B01J 29/072*   (2006.01)
  *B01J 29/076*   (2006.01)
  *B01J 29/08*    (2006.01)
  *B01J 29/10*    (2006.01)
  *B01J 29/12*    (2006.01)
  *B01J 29/14*    (2006.01)
  *B01J 29/16*    (2006.01)
  *C10G 11/05*    (2006.01)

(52) U.S. Cl. ............... 502/69; 502/20; 502/64; 502/65; 502/66; 208/120.01; 208/120.05; 208/120.1; 208/120.15; 208/120.2; 208/120.25; 208/120.3; 208/120.35

(58) Field of Classification Search ............... 502/60, 502/64, 79, 20, 65, 66, 69; 208/120.01, 120.1, 208/120.05, 120.15, 120.2, 120.25, 120.3, 208/120.35
See application file for complete search history.

(56) References Cited

U.S. PATENT DOCUMENTS

| | | | |
|---|---|---|---|
| 3,293,192 A | 12/1966 | Maher et al. | 252/430 |
| 3,402,996 A | 9/1968 | Maher et al. | 23/112 |
| 3,607,043 A | 9/1971 | McDaniel et al. | 23/111 |
| 3,676,368 A | 7/1972 | Scherzer et al. | 252/455 Z |
| 3,957,689 A | 5/1976 | Ostermaier et al. | 252/455 |
| 4,126,579 A | 11/1978 | Flaherty et al. | 252/455 Z |
| 4,188,285 A | 2/1980 | Michlmayr | 208/246 |
| 4,218,344 A | 8/1980 | Vasalos | 502/64 |
| 4,226,743 A | 10/1980 | Seese et al. | 252/453 |
| 4,267,072 A | 5/1981 | Vasalos | 252/455 Z |
| 4,280,898 A | 7/1981 | Tatterson et al. | 208/119 |
| 4,359,378 A | 11/1982 | Scott | 208/120 |
| 4,458,023 A | 7/1984 | Welsh et al. | 502/65 |
| 4,493,902 A | 1/1985 | Brown et al. | 502/65 |
| 4,500,645 A * | 2/1985 | Fuchikami et al. | 502/65 |
| 4,515,902 A | 5/1985 | Shioiri et al. | 502/64 |
| 4,542,116 A | 9/1985 | Bertolacini et al. | 502/65 |
| 4,588,701 A | 5/1986 | Chiang et al. | 502/65 |
| 4,606,813 A | 8/1986 | Byrne et al. | 208/120 |
| 4,627,911 A * | 12/1986 | Chen et al. | 208/120.01 |
| 4,738,941 A | 4/1988 | Dufresne et al. | 502/66 |
| 4,764,269 A | 8/1988 | Edwards et al. | 208/120 |
| 4,781,815 A | 11/1988 | Pellet et al. | 208/120 |
| 4,790,982 A | 12/1988 | Yoo et al. | 423/239 |
| 4,791,084 A | 12/1988 | Sato et al. | 502/65 |
| 4,855,036 A | 8/1989 | Chiang et al. | 208/120 |
| 4,877,514 A | 10/1989 | Hettinger et al. | 208/120 |
| 4,889,617 A | 12/1989 | English | 208/121 |
| 4,957,718 A | 9/1990 | Yoo et al. | 423/244 |
| 4,957,892 A | 9/1990 | Yoo et al. | 502/63 |
| 4,963,520 A | 10/1990 | Yoo et al. | 502/64 |
| 4,965,233 A | 10/1990 | Speronello | 502/65 |
| 5,002,654 A | 3/1991 | Chin | 208/121 |
| 5,068,481 A * | 11/1991 | Akatsu et al. | 585/426 |
| 5,070,052 A | 12/1991 | Brownscombe et al. | 502/60 |
| 5,146,039 A | 9/1992 | Wildt et al. | 585/820 |
| 5,376,608 A | 12/1994 | Wormsbecher et al. | 502/61 |
| 5,525,210 A | 6/1996 | Wormsbecher et al. | 208/122 |
| 5,601,798 A * | 2/1997 | Cooper et al. | 423/700 |
| 5,670,037 A | 9/1997 | Zaiting et al. | 208/114 |
| 5,686,374 A * | 11/1997 | Nakaoka | 502/313 |
| 5,990,030 A | 11/1999 | McCauley | 502/64 |
| 6,007,704 A | 12/1999 | Chapus et al. | 208/218 |
| 6,036,847 A | 3/2000 | Ziebarth et al. | 208/113 |
| 6,482,315 B1 * | 11/2002 | Roberie et al. | 208/249 |
| 6,635,168 B2 | 10/2003 | Zhao et al. | 208/120.01 |
| 6,638,892 B1 * | 10/2003 | Wu et al. | 502/307 |
| 2002/0153282 A1 * | 10/2002 | Cheng et al. | 208/120.2 |
| 2002/0153283 A1 * | 10/2002 | Chester et al. | 208/120.2 |
| 2002/0179492 A1 * | 12/2002 | Zhao et al. | 208/120.01 |
| 2002/0179498 A1 | 12/2002 | Chester et al. | 208/230 |
| 2004/0110629 A1 | 6/2004 | Stamires et al. | 502/60 |
| 2005/0189260 A1 * | 9/2005 | Chester et al. | 208/120.01 |

FOREIGN PATENT DOCUMENTS

CA            967136        5/1975 ............... 252/60

(Continued)

OTHER PUBLICATIONS

P-O.F. Andersson, M. Pirjamali, S.G. Järås, M. Boutonnet-Kizling, "tracking Catalyst Additives for Sulfur Removal from FCC Gasoline", Catalysis Today 53 (1999) 565-573.

(Continued)

*Primary Examiner* — David M Brunsman
(74) *Attorney, Agent, or Firm* — Charles A. Cross

(57) ABSTRACT

The present invention is directed to certain catalyst compositions and processes that are capable of reducing sulfur compounds normally found as part of the gasoline fraction streams of fluid catalytic cracking processes. The present invention is a cracking catalyst composition comprising a zeolite in combination with a Lewis Acid containing component, wherein the cracking catalyst composition comprises 0.2% Na$_2$O or less. It has been found that sulfur compounds in hydrocarbon feeds to fluid catalytic cracking processes can be reduced by at least 15% compared to the same composition, which does not comprise the aforementioned Lewis Acid containing component.

69 Claims, 8 Drawing Sheets

FOREIGN PATENT DOCUMENTS

| | | | |
|---|---|---|---|
| EP | 461851 A | * | 12/1991 |
| EP | 0 583 025 | | 2/1994 |
| EP | 0 554 968 | | 10/1997 |
| GB | 1315553 | | 5/1973 |
| GB | 2341191 | | 3/2000 |
| WO | 01/21732 | | 3/2001 |
| WO | 02 08300 | | 1/2002 |
| WO | 02/083300 | | 10/2002 |
| WO | 93/19138 | | 9/2005 |

OTHER PUBLICATIONS

Mystrad et al., "Effect of Nickel & Vanadium on Sulfur Reduction of FCC Naptha", Applied Catalyst A: General 192 (2000)—pp. 299-305.

Krishna at al., "Additives Improved FCC Process/Hydrocarbon Process", Hydrocarbon Processing, Nov. 1991, pp. 59-66.

Breck, D.W., "Zeolite Molecular Sieves", Structural Chemistry & Use (1974) p. 94.

American Chemical Society Symposium Series, No. 634, "Contaminant-Metal Deactivation and Metal-Dehydrogenation Effects During Cyclic Propylene Steaming of Fluid Catalytic Cracking Catalysts", Ch 12, pp. 171-183 (1996) by L.T. Boock, T.F. Petti, and J.A. Rudesill.

Cheng, W.; Suarez, W.; and Young, G.; AIChE Symposium Series; Catalytic Cracking; "The Effect of Catalyst Properties on the Selectivities of Isobutene and Isoamylene in FCC", No. 291, vol. 88, pp. 38-44.

Cheng, W., Roberie, T., Suarez, W., Young, G.; National Petroleum Refiners Association; "Reformulated Gasoline: The Role of Current and Future FCC Catalysts", Presented at 1991 NPRA Annual Meeting, Mar. 17-19, 1991, Convention Center, San Antonio, Texas, AM-91-34.

Journal of Catalysis 85. "Prediction of Cracking Catalyst Behavior by a Zeolite Unit Cell Size Model"; pp. 466-476 (1984) by Pine, L.A., Maher, P.J., and Wachter, W.A.; Exxon Research & Development Laboratories, Baton Rouge, LA.

Fifth International Symposium on the Advances in Fluid Catalytic Cracking, Aug. 22-26, 1999, New Orleans, LA. "Gasoline Sulfur Removal. Kinetics of S. Compounds in FCC Conditions" by A.Corma, P. Gullbrand, C. Martinez at Instituto de Tecnologia Ouimica, UPV-CSIC, Av. Los Naranjos, s/n. 46022—Valencia, Spain.

G. W. Young, G.D. Weatherbee, and S.W. Davey, "Simulating Commercial FCCU Yields With the Davison Circulating Riser (DCR) Pilot Plant Unit," National Petroleum Refiners Association (NPRA) Paper AM88-52.

J.S. Magee and M.M. Mitchell, Jr. Eds. Studies in Surface Science and Catalysis vol. 76, Ch 8, pp. 257-292, Elsevier Science Pulbishers B.V., Amsterdam 1993, ISBN 0-444-89037-8 ; G.W. Young, "Realistic Assessment of FCC Catalyst Performance in the Laboratory," in Fluid Catalytic Cracking: Science and Technology.

Albro et al. "Quantitative Determination of Sulfur Compounds in FCC Gasolines" by AED—A study of the Effect of Catalyst Type & Catalytic Conditions on Sulfur Distribution, Journal of Resolution Chromatography, vol. 16, Jan. 1993.

Beyerlein et al., Fluid Catalytic Cracking II—Concepts in Catalyst Design. Ocelli, M.L. Ed. ACS Symposium Series 452, American Chemical Society: Washington, DC, pp. 109-143 (1991).

Palmer et al., Appl. Catalysis, vol. 35, pp. 217-235 (1987).

"Fluidization Engineering" Second Edition, Buttersworth-Heinemann, 1991, pp. 77-79, 93.

Fluid Catalytic Cracking: Science and Technology (1993), pp. 339-346.

* cited by examiner

GASOLINE SULFUR REDUCTION CATALYST FOR FLUID CATALYTIC CRACKING PROCESS

FIELD OF THE INVENTION

The present invention is directed to an improved catalyst composition useful in fluid catalytic cracking processes. The present catalyst composition is capable of reducing sulfur compounds normally found as part of the gasoline fraction streams of such processes. The present invention accordingly provides product streams of light and heavy gasoline fractions with substantially lower amounts of sulfur-containing compounds, and an improved catalytic cracking process when the invention is used as a catalyst in such processes.

BACKGROUND OF THE INVENTION

Catalytic cracking is a petroleum refining process that is applied commercially on a very large scale. Indeed, fluidized catalytic cracking (FCC) processes produces a large amount of the refinery gasoline blending pool in the United States. In the process, heavy hydrocarbon feedstocks are converted into lighter products by reactions taking place at elevated temperatures in the presence of a catalyst, with the majority of reactions taking place in the vapor phase. The feedstock is thereby converted into gasoline, distillates and other liquid fraction product streams as well as lighter gaseous cracking products having four or less carbon atoms per molecule. The three characteristic steps of a catalytic cracking process comprises: a cracking step in which the heavy hydrocarbon feed stream is converted into lighter products, a stripping step to remove adsorbed hydrocarbons from the catalyst material, and a regeneration step to burn off coke formations from the catalyst material. The regenerated catalyst is then recirculated and reused in the cracking step.

Catalytically cracked feedstocks normally contain organic sulfur compounds, such as mercaptans, sulfides, thiophenes, benzothiophenes, dibenzothiophenes, and other sulfur-containing species. The products of the cracking process correspondingly tend to contain sulfur impurities even though about half of the sulfur compounds are converted to hydrogen sulfide during the cracking process, mainly by catalytic decomposition of non-thiophenic sulfur compounds. The thiophenic compounds have been found to be most difficult to remove. The specific distribution of sulfur in the cracking products is dependent on a number of factors including feed, catalyst type, additives present, conversion and other operating conditions, but, in any event a certain proportion of the sulfur tends to enter the light or heavy gasoline fractions and passes over into the product pool. Although petroleum feedstock normally contains a variety of sulfur born contaminants, one of the chief concerns is the presence of unsubstituted and hydrocarbyl substituted thiophenes and their derivatives, such as thiophene, methylthiophene, ethylthiophene, propylthiophene, tetrahydrothiophene, benzothiophene and the like in the heavy and light gasoline fraction product streams of FCC processes. The thiophenic compounds generally have boiling points within the range of the light and heavy gasoline fractions and, thus, become concentrated in these product streams. With increasing environmental regulation being applied to petroleum products, for example in the Reformulated Gasoline (RFG) regulations, there has been numerous attempts to reduce the sulfur content of the products, especially those attributable to thiophenic compounds.

One approach has been to remove the sulfur from the FCC feed by hydrotreating before cracking is initiated. While highly effective, this approach tends to be expensive in terms of the capital cost of the equipment as well as operationally since hydrogen consumption is high. Another approach has been to remove the sulfur from the cracked products by hydrotreating. Again, while effective, this solution has the drawback that valuable product octane may be lost when the high octane olefinic components become saturated.

From an economic point of view, it would be desirable to achieve thiophenic sulfur removal in the cracking process itself since this would effectively desulfurize the major components of the gasoline blending pool without additional treatment. Various catalytic materials have been developed for the removal of sulfur during the FCC process cycle. For example, an FCC catalyst impregnated with vanadium has been shown to reduce the level of product sulfur (See U.S. Pat. No. 6,482,315). This reference also discloses a sulfur reduction additive based on a zinc-impregnated alumina.

Other developments for reducing product sulfur have centered on the removal of sulfur from the regenerator stack gases. An early approach developed by Chevron used alumina compounds as additives to the inventory of cracking catalyst to adsorb sulfur oxides in the FCC regenerator; the adsorbed sulfur compounds which entered the process in the feed were released as hydrogen sulfide during the cracking portion of the cycle and passed to the product recovery section of the unit where they were removed (See Krishna et al., *Additives Improved FCC Process*, Hydrocarbon Processing, November 1991, pages 59-66). Although sulfur is removed from the stack gases of the regenerator, product sulfur levels are not greatly affected, if at all.

An alternative technology for the removal of sulfur oxides from regenerator stack gases is based on the use of magnesium-aluminum spinels as additives to the circulating catalyst inventory in the FCC unit (FCCU). Exemplary patents disclosing this type of sulfur removal additives include U.S. Pat. Nos. 4,963,520; 4,957,892; 4,957,718; 4,790,982 and others. Again, however, sulfur content in liquid products, such as gasoline, was not greatly affected.

A catalyst composition to reduce sulfur levels in liquid cracking products has been described by Wormsbecher and Kim in U.S. Pat. Nos. 5,376,608 and 5,525,210. These patents propose the addition of low amounts of an additive composed of an alumina-supported Lewis Acid to conventional zeolite-containing cracking catalyst. Although this system has the advantages of causing sulfur reduction in the cracking process, it is generally believed that use of greater than about 10 weight percent of the described additives in the catalyst composition does not provide a benefit (e.g. high sulfur removal while retaining the selectivity of other products) proportional to the level of the additive. In view of the fact that an FCCU can only contain a fixed amount of fluidized particulates, the inclusion of additives, such as the alumina-supported Lewis Acid additives of Wormsbecher and Kim, causes a reduction in the amount of the base cracking catalyst contained in the FCCU and thus, a proportional reduction in the conversion of heavy feedstock to desired products.

U.S. Pat. No. 6,635,168 discloses a FCC catalyst composition composed of Lewis Acid-containing alumina and Y-type zeolite containing catalyst to provide a composition having a kinetic conversion activity of at least 2. This product was developed in part to address disadvantages associated with the aforementioned Lewis Acid components. Indeed, the compositions described in U.S. Pat. No. 6,635,168 provide a reduced sulfur (e.g., thiophenes and derivatives thereof) content in light and heavy gasoline fractions of the FCC processes, (about 34%).

Sulfur standards are becoming more stringent as evidenced by the fact that the U.S. Environmental Protection Agency has set new standards for gasoline sulfur content and is reducing the average from the current standard of 350 ppm sulfur to about 30 ppm by 2006. It therefore would be desirable to have a catalyst composition suitable for use in FCC processes wherein the catalyst is capable of significantly reducing the level sulfur even further than those achieved using additives described in WO 02/08300, especially reducing the level of thiophenes, and their derivatives from light and heavy gasoline fractions while substantially retaining conversion of feedstock to desired product, e.g., substantially reducing the levels of thiophene and its derivatives as part of the functions of the FCC process while substantially maintaining the overall cracking activity and product selectivities. It is also desirable to have an additive possessing sulfur reduction activity that does not substantially degrade in relatively short periods of time, i.e., the additive's sulfur reduction activity is maintained over longer periods of time.

SUMMARY OF THE INVENTION

Figure 1:
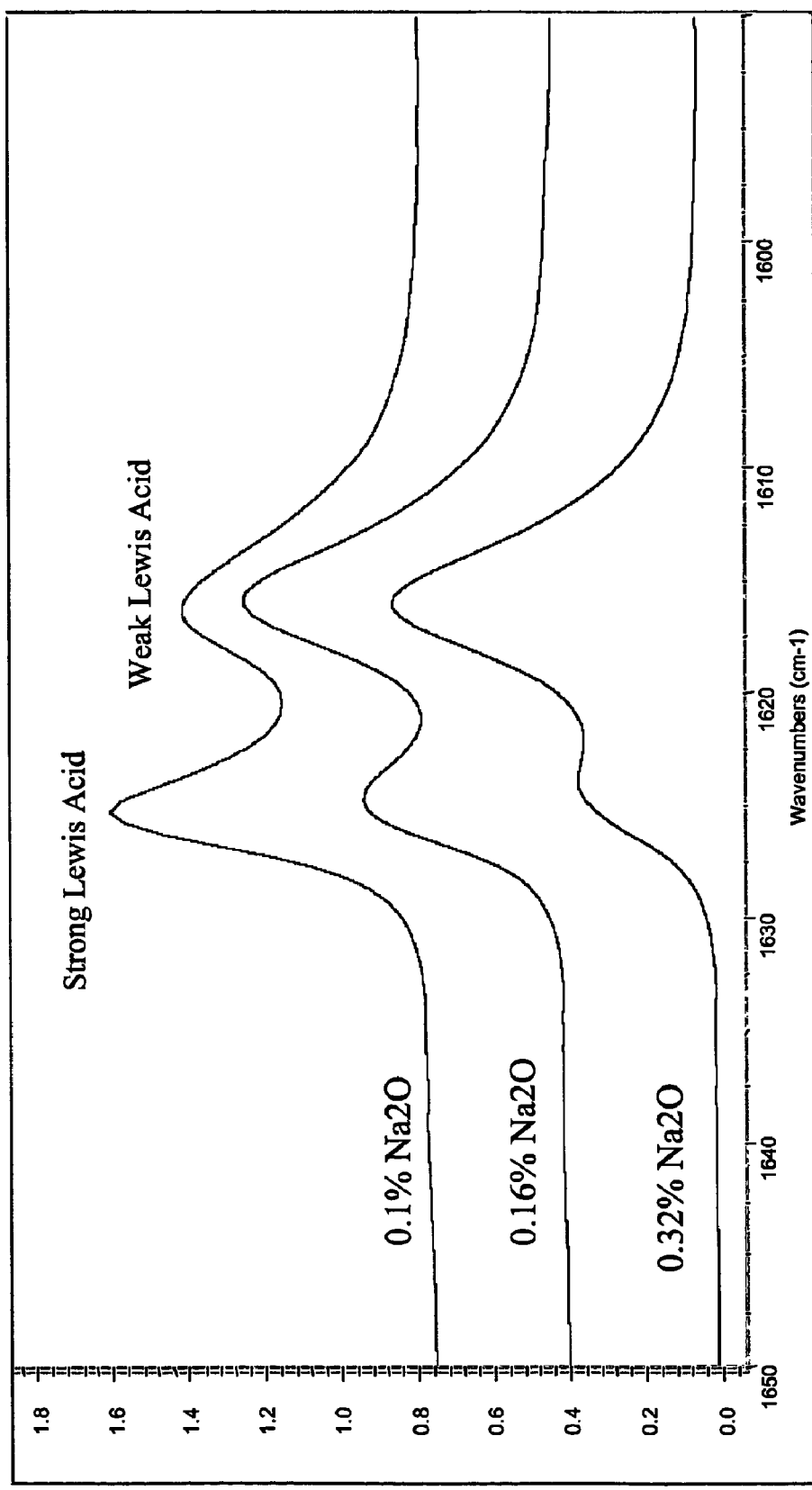
FIG. 1 illustrates the effect of sodium on Lewis Acid sites of a Lewis Acid-containing additive for gasoline sulfur reduction.

The present invention is an improved cracking catalyst composition comprising zeolite and Lewis Acid-containing component, wherein the cracking catalyst composition comprises a relatively low amount of sodium as measured by $Na_2O$. This invention is based on the discovery that sodium affects the Lewis Acid sites believed to be responsible for catalyzing sulfur reduction brought about by Lewis Acid-based gasoline sulfur reduction additives. The $Na_2O$ content in the catalyst of this invention is generally 0.20% or less. It has been discovered that if the $Na_2O$ level of the catalyst composition is relatively greater than that, the number of Lewis Acid sites in the composition is significantly reduced and therefore there is a decrease in the ability of the composition to reduce gasoline sulfur. The compositions of this invention are preferably prepared from zeolite having a sodium content of about 0.5% by weight or less in combination with a Lewis Acid-containing component that preferably comprises no more than 0.1% by weight $Na_2O$, i.e., 0.1% or less by weight $Na_2O$, as fully described herein below. The catalyst composition as a whole preferably contains no more than 0.15% $Na_2O$, and more preferably no more than 0.1% $Na_2O$. The present invention therefore provides for a method of reducing the amount of sulfur in gasoline from an FCC unit and therefore the invention further comprises an improved FCC process wherein a sulfur-containing hydrocarbon feedstock is contacted with the present FCC catalyst composition in an FCCU, and the hydrocarbon product therefrom has a sulfur content of at least 15% less than that produced when using a catalyst composition that does not contain the Lewis Acid component of this invention.

As a result of discovering the affect that sodium has on Lewis Acid based sulfur reduction compositions, it is also believed the invention leads to a new method of making FCC suitable catalyst compositions containing Lewis Acid components. Briefly, the method for making the catalyst comprises (a) selecting a zeolite comprising about 0.5 percent by weight $Na_2O$ or less, (b) selecting a Lewis Acid-containing component comprising about 0.1 percent $Na_2O$ or less, and (c) combining said zeolite and Lewis Acid-containing component in proportions sufficient to produce a catalyst composition that comprises about 0.2 percent by weight $Na_2O$ or less.

DETAILED DESCRIPTION OF THE INVENTION

The present invention should be in a form capable of being maintained within a FCCU. FCC catalysts typically contain zeolite, which is a fine porous powdery material composed of the oxides of silicon and aluminum. In certain instances other elements may also be present in small amounts. The zeolites are typically incorporated into matrix and/or binder and particulated. When the particulate is aerated with gas, the particulated catalytic material attains a fluid-like state that allows it to behave like a liquid. This property permits the catalyst to have enhanced contact with the hydrocarbon feedstock feed to the FCCU and to be circulated between the reactor and the other units of the overall process (e.g., regenerator). Hence, the term "fluid" has been adopted by the industry to describe this material.

Zeolite

Zeolite suitable for use in this invention, also referred to herein as zeolite (a), can be any zeolite having catalytic activity in a hydrocarbon conversion process. Suitable zeolites comprise crystalline alumino-silicate zeolites such as synthetic faujasite, i.e., type Y zeolite, type X zeolite, Zeolite Beta, ZSM-5, as well as heat treated (calcined) and/or rare-earth exchanged derivatives thereof. Zeolites that are particularly suited include calcined, rare-earth exchanged type Y zeolite (CREY), the preparation of which is disclosed in U.S. Pat. No. 3,402,996, ultra stable type Y zeolite (USY) as disclosed in U.S. Pat. No. 3,293,192, as well as various partially exchanged type Y zeolites as disclosed in U.S. Pat. Nos. 3,607,043 and 3,676,368. The zeolite of this invention may also be blended with molecular sieves such as SAPO and ALPO as disclosed in U.S. Pat. No. 4,764,269.

Particularly preferred Y zeolites include MgUSY, ZnUSY, MnUSY, HY, REY, CREY, USY, CREUSY, REUSY zeolites, and mixtures thereof.

Standard Y-type zeolite is commercially produced by crystallization of sodium silicate and sodium aluminate. This zeolite can be converted to USY-type by dealumination, which increases the silicon/aluminum atomic ratio of the parent standard Y zeolite structure. Dealumination can be achieved by steam calcination or by chemical treatment.

The rare earth exchanged zeolites used in the invention are prepared by ion exchange, during which sodium atoms present in the zeolite structure are replaced with other cations, usually as mixtures of rare-earth metal salts such as those salts of cerium, lanthanum, neodyminum, naturally occurring rare-earths and mixtures thereof to provide REY and REUSY grades, respectively. These zeolites may be further treated by calcinations, e.g., to provide CREY and CREUSY types of material. MgUSY, ZnUSY and MnUSY zeolites can be formed by using the metal salts of Mg, Zn or Mn or mixtures thereof in the same manner as described above with respect to the formation of USY except that salts of magnesium, zinc or manganese is used in lieu of the rare-earth metal salt used to form REUSY.

The most preferred zeolites are USY, REY, REUSY, CREY and CREUSY with the rare-earth grades being most preferred.

The unit cell size of a preferred fresh Y-zeolite is about 24.5 to 24.7 Å. The unit cell size (UCS) of zeolite can be measured by x-ray analysis under the procedure of ASTM D3942. There is normally a direct relationship between the relative amounts of silicon and aluminum atoms in the zeolite and the size of its unit cell. This relationship is fully described in Zeolite Molecular Sieves, Structural Chemistry and Use (1974) by D. W. Breck at Page 911, which teaching is incorporated herein in its entirety by reference. Although both the zeolite, per se, and the matrix of a fluid cracking catalyst usually contain both silica and alumina, the $SiO_2/Al_2O_3$ ratio of the catalyst matrix should not be confused with that of the zeolite. When an equilibrium catalyst is subjected to x-ray analysis, it only measures the UCS of the crystalline zeolite contained therein.

The unit cell size value of a zeolite also decreases as it is subjected to the environment of the FCC regenerator and reaches equilibrium due to removal of the large size aluminum atoms from the crystal structure. Thus, as the zeolite in the FCC inventory is used, its framework Si/Al atomic ratio increases from about 3:1 to about 30:1. The unit cell size correspondingly decreases due to shrinkage caused by the removal of aluminum atoms from the cell structure. The unit cell size of a preferred equilibrium Y zeolite is at least 24.22 Å, preferably from 24.30 to 24.50 Å, and more preferably from 24.30 to 24.38 Å.

Zeolite (a) of this invention can be in particles, which can be particles that are separate from Lewis Acid-containing component (b) described in more detail below. Particles containing the zeolite can be formed by standard techniques, which normally include the steps of mixing the zeolite with clay and, optionally, active matrix material. Binder is then added and the zeolite, active matrix material and binder are formed into a uniform aqueous dispersion followed by spray drying and, optionally, calcining. Such procedures are disclosed in U.S. Pat. Nos. 3,957,689; 4,126,579; 4,226,743; 4,458,023 and Canadian Patent 967,136. The teachings of these references are incorporated herein in their entirety by reference. Zeolite-containing particles, e.g., Y-type zeolite-containing particles, that are suitable for this invention comprise at least about 40 weight percent zeolite with the remainder usually being active matrix and binder. When more highly active catalyst compositions such as those described below are desired, zeolite-containing particles comprising at least about 50, preferably at least 60, and more preferably at least 65 weight percent zeolite are preferable for inclusion in the catalyst composition.

Suitable active-matrix materials include, but are not limited to, alumina, silica and porous alumina-silica. The average particle size of the zeolite-containing catalyst composition should be from about 20 to about 150 microns, preferably from 60 to 90 microns, to permit it to be readily used in a fluidized state required in FCC process units. Alumina is preferred for some embodiments of the invention, and may form all or part of the active-matrix component of the catalyst.

Suitable binders include, but are not limited to, alumina sols, silica sols, aluminas, and silica aluminas.

As stated earlier, the sodium content of the catalyst composition containing the zeolite and Lewis Acid component should be 0.20% by weight or less. In particular, sodium will migrate from the composition containing zeolite to the Lewis Acid component when the composition of the two materials is exposed to FCC conditions, e.g., temperature and steam, over extended periods of time. The Examples below show a steady decrease in sulfur reduction performance as more sodium migrates to the Lewis Acid component. Sodium content depends on the amount of sodium in the zeolite and any optional matrix and binders, as well as the amount of any sodium in the Lewis Acid component.

In general, it is preferable that the zeolite or the component containing the zeolite has a relatively low level of sodium, e.g., preferably 0.3% $Na_2O$ or less, but this is not required, e.g., especially if the Lewis Acid component has very low sodium levels, a smaller amount of the zeolite is included in the catalyst composition relative to the Lewis Acid component, and/or as long as the total cracking catalyst composition after the zeolite is added has a sodium level less than 0.2% $Na_2O$. In general, however, the zeolite of this invention should contain no more than 0.5% $Na_2O$. It has been shown that sodium can migrate from the zeolite to the Lewis Acid components thereby affecting the Lewis Acid sites and the effectiveness of the composition to reduce sulfur.

Zeolites having the aforementioned levels of sodium can be prepared, for example, by washing them in ammonium sulfate baths, in which sodium on the zeolite is exchanged with ammonium cations. The exchanged zeolite is then further washed in water to remove sodium sulfate salt that results from the exchange. Other ammonium salts may be used in the exchange bath. This exchange can be separate from the exchange of rare earth cations onto the zeolite when employing rare earth exchanged zeolites.

It is also preferred to prepare catalysts having relatively high kinetic conversion activity. FCC catalysts rely on zeolites as their primary source of kinetic conversion activity. It is preferable for the catalysts of this invention to have a kinetic conversion activity value (at equilibrium catalyst stage) of at least about 2, preferably of from 2 to 3 or higher, and more preferably about 3 to about 6.

The activity of a catalyst can also be quantified using the Breck equation, which can be used to indicate the number of active sites in a catalyst composition. More specifically, the Breck equation indicates that the number of active sites on a zeolite is proportional to the zeolite's unit cell size (USC) as follows:

Active sites is proportional to (UCS-24.19)115×% zeolite in catalyst

One can achieve the desired activity by having sufficient amount of a zeolite in the overall catalyst composition. In general, the activity of the catalyst composition is increased by increasing the amount of zeolite in the composition. The amount of zeolite in the composition can be increased using the amount of the zeolite-containing particles described earlier.

Another method of providing a highly active equilibrium catalyst is by utilizing zeolite that contains sufficient exchanged rare-earth metal ions. Preparing such zeolites is already described above. The greater the number of exchanged rare-earth ions within the zeolite, the greater the UCS of the resultant zeolite and, therefore, the activity of the simulated equilibrium zeolite, as required in the present catalyst composition. When the catalyst is a Y-type zeolite containing rare-earth metal ions, the amount of exchanged rare-earth metal ions may be from 2 to about 18, preferably from 5 to 18, and more preferably from 8 to 12 weight percent, as rare-earth oxide, based on the zeolite. Thus, for example, when using Y-type zeolites that are exchanged with about 8% by weight rare earth, suitably active catalyst compositions of this invention can comprise at least about 15, preferably at least about 35, and for highly active catalysts at least about 50% by weight zeolite.

Thus, when using a Y-type catalyst containing exchanged rare-earth ions within its structure (e.g. REY- or REUSY-type zeolites), the rate of replacement of catalyst is normally lower than when using non-rare-earth ion containing USY or other Y-type zeolite catalyst.

A preferred embodiment of the invention is a cracking catalyst composition comprising a Y-type zeolite having 0.3%, and even more preferably 0.10%, by weight $Na_2O$ or less, and further the catalyst composition preferably having a kinetic conversion activity in the range of from about 3.0 to about 5.0, as defined later below. When using conventional non-cracking catalyst FCC additives, it has been understood by those skilled in this art that only low amounts of the additive can be present. This understanding is based on finding that past additive compositions dilute the amount of cracking catalyst present and, thus, causes a reduction of the overall activity of the equilibrium cracking catalyst composition to below that desired to provide an economically efficient process (See Krishna et al., *Additives Improved FCC Process*, supra.) Catalysts comprising the invention however can exhibit relatively higher kinetic conversion activity while causing substantial reduction of thiophene and its derivatives present in the FCCU feedstock. Thus the present catalyst composition provides a means of producing an environmentally attractive product in an economically attractive manner.

Lewis Acid Component

The Lewis Acid component of the invention, hereinafter referred to as Lewis Acid component (b), can be a Lewis Acid per se, a compound containing Lewis Acid, or a compound containing Lewis Acid sites. A Lewis Acid or a Lewis Acid site is defined herein as any molecule or electrophilic ion that can combined with another molecule or ion by forming a covalent bond with two electrons from the second molecule or ion, with the Lewis Acid being the electron acceptor. Alumina itself is a suitable Lewis Acid component. It is preferable for this invention, however, that the Lewis Acid component comprises a metal selected from the group consisting of Ni, Cu, Zn, Ag, Cd, In, Sn, Hg, Ti, Pb, Bi, B, Al, Mn, Ga and mixtures thereof, wherein the metal is present as an oxide, as a cation or is in its zero metal valence state. More preferred Lewis Acid components are compounds having a metal selected from the group consisting of Zn, Ti, Co, Mo, Fe and mixtures thereof. Even more preferable is a Lewis Acid component (b) in which Zn is the major metal in the component and most preferably wherein Zn is the sole metal present in component (b).

Lewis Acid component (b) can be a particulate that has been reacted/impregnated with a Lewis Acid or compound containing Lewis Acid. Suitable particulates have an average particle size corresponding to that of conventional cracking catalyst compositions, e.g., from about 20 to about 150, typically from about 60 to 90 microns, and high surface area of from about 30 to 400 $m^2/g$, preferably from about 150 to 400 $m^2/g$. When impregnating a particulate to make this invention, the particles are contacted with a solution of a salt of the Lewis Acid, which for this invention is typically a Lewis Acid metal. Typically, aqueous solutions, which contain from about 10 to 20 weight percent of a soluble Lewis Acid metal salt, such as zinc nitrate, chloride, sulfate, and the like, are used to impregnate the substrate to incipient wetness, i.e., substantially fill the substrate pore volume. The particles are typically made of matrix, e.g., inorganic oxide matrix described earlier for making separate particles of the zeolite component of this invention. It is especially preferred that when using one or more of the aforementioned Lewis Acid metals, the metal(s) is (are) present in conjunction with alumina, and in particular, it is preferred that the metal(s) is (are) supported on alumina. U.S. Pat. Nos. 5,376,608 and 5,525,210 describe processes that are suitable for making Lewis Acid impregnated substrates, these two patents being incorporated herein in their entirety by reference.

The Lewis Acid component can also be prepared by spray drying inorganic oxide supports with other particulate precursors, e.g., aluminum chlorohydrol, and a Lewis Acid salt under conventional spray drying conditions to form a particulate, e.g., alumina, comprising Lewis Acid.

As indicated earlier, the invention can be a physical mixture of Lewis Acid component (b) and zeolite (a) as separate particulates, in which case inorganic oxide matrix would be present as matrix for either, or both, (a) and (b). In embodiments where (a) and (b) are in a single particulate, the matrix can contain separate particles of (a) and separate particles of (b). This may be accomplished by simultaneously spray drying zeolite and Lewis Acid with matrix to provide a combined single particulate composite product having the proper proportions of the two components therein. Alternatively, a particulate comprising (a) can be impregnated with a metal salt employed to create (b). As mentioned earlier, alumina is a preferred inorganic matrix.

The Lewis Acid component can also be in the form of a Lewis Acid metal cation exchanged on the zeolite prior to the zeolite being incorporated into active matrix and optional binder. In such an embodiment, the zeolite is exchanged with a Lewis Acid metal cation in an amount sufficient to impart suitable gasoline sulfur reduction properties to the overall catalyst composition. In typical cases, the amount of the Lewis Acid cation exchanged onto the zeolite is at least about 3% by weight. Suitable examples of such embodiments are the aforementioned ZnUSY and MnUSY zeolites wherein the amount of Zn or Mn cations exchanged thereon is at least about 3% by weight.

In embodiments where Lewis Acid is impregnated onto a particulate to form component (b), the impregnated particulate is dried under moderate temperatures (e.g., 100° to 150° C.). Once dried, the Lewis Acid component, regardless of the method used to form it, is usually calcined at temperatures ranging from 200 to 850° C. to remove any anionic component of the Lewis Acid metal salt, e.g., present in an impregnation solution. The metal of the resultant Lewis Acid-containing component is present as an oxide, as a cation, is in its zero valance state, or is present as a mixture of the foregoing. The surface area of the particulate should be as high as possible, so as to provide means to distribute the Lewis Acid throughout the particulate matrix to as high a degree as possible. The methodology of incipient wetness impregnation achieves such distribution.

It is mentioned earlier that alumina is a suitable Lewis Acid component for this invention, and in such a case it is preferable that the Lewis Acid component consist essentially of alumina. In embodiments of the Lewis Acid-containing component that contain a Lewis Acid metal, the Lewis Acid-containing component contains from about 1 to about 50 weight percent, preferably from about 10 to 40 weight percent of Lewis Acid, which when the Lewis Acid is a metal, it is expressed as metal oxide, and the balance being matrix (excluding the small percentage of rare-earth metals).

In general, the Lewis Acid component should have no more than about 0.1% as measured by $Na_2O$ content. This can be accomplished by employing Lewis Acid compounds having the appropriate levels of $Na_2O$. For example, aluminas are commercially available through companies, such as Sasol and Alcoa, wherein the $Na_2O$ content of those aluminas can be as low as 0.002% (Sasol catalog).

When an alumina source has $Na_2O$ content higher than the level required for this invention, the $Na_2O$ concentration can be lowered by washing, e.g., with ammonium sulfate baths. In particular, one can dissolve one part of ammonium sulfate in 10 parts of deionized water at 70° C. Add one part of alumina in the solution and stir for 10 minutes. The slurry is filtered and rinsed with 30 parts of deionized water. If the $Na_2O$ concentration is above the required level, repeat the procedure again until the $Na_2O$ is below the required level.

As illustrated in more detail later below in the Examples, it is also preferable to minimize the amount of silica that is present on and/or migrates to the Lewis Acid component in order to attain optimal sulfur reduction. Without being held to any particular theory, it is believed that if any silica that comes in contact with the Lewis Acid component can affect the invention's overall sulfur reduction properties. When making the component containing zeolite (a), it is preferable to select matrix and binder materials that have relatively low amounts of silica, for example, no more than 5% silica, as measured using ICP. Nevertheless, one can prepare the catalyst composition of this invention with a matrix comprising clay in which $SiO_2$ is relatively bound or otherwise in a form that does not migrate in large amounts to the Lewis Acid component. Accordingly, it is also not expected that $SiO_2$ present in zeolite significantly affects the Lewis Acid sites of the invention.

Once prepared, the Lewis Acid-containing component can comprise from an amount in the range of 3% to about 75 weight percent of the catalyst composition. For embodiments of the invention comprising Lewis Acid-containing particulates that are separate from zeolite-containing particulates, the catalyst composition preferably comprises from 30 to 75 weight percent, and more preferably about 40 to about 75% weight percent Lewis Acid component. The final catalyst composition to be added to the FCCU has particles having an average particle size ranging from about 20 to about 150 microns. As with any cracking catalyst, the amount of catalyst used in the cracking process will vary by FCC unit, feedstock, operating conditions and desired output as is well known in the art. For this invention, the amount of sulfur in the FCC feedstock will also typically be a factor in determining the amount of the inventive composition added.

In typical conditions, the most convenient manner of using the catalyst composition of this invention is to introduce the zeolite and the Lewis-type acid-containing component into the FCCU as separate particles. When used in this manner, the exact proportions of the components of the catalyst composition with respect to the particular feedstock being subject to FCC process can be readily achieved.

Catalyst compositions of this invention may further comprise conventional additives, such as, for example, octane enhancing catalysts, CO combustion promoters, bottoms cracking promoters, $SO_x$ reduction additives, metals passivation additions and the like as deemed appropriate and in the amounts well known to those skilled in this art. The optional additives are simply added to the composition when the catalyst composition contains a physical blend of (a) and (b). When (a) and (b) are integrated into the same particle, the optional additives can be blended with the integrated particles, or included in matrix added to the spray drier feed that forms the integrated catalyst composition.

Additional materials that can also be included in the composition of this invention are additional gasoline sulfur reduction additives. Such additives that are suitable for this invention include the vanadium-containing component described in U.S. Pat. No. 6,482,315, the contents of which are incorporated herein by reference. Briefly, a separate particulated additive comprising a support, preferably a non-molecular sieve support, and vanadium can be blended with the invention to further enhance the gasoline sulfur reduction properties of the invention. As described in U.S. Pat. No. 6,482,315, this additional additive typically contains from about 2 to about 20 weight percent, more typically about 3 to about 10 weight percent, and preferably from about 5 to about 7 weight percent metal (based on total weight of additive). These additives can be prepared by adding vanadium to the support in a manner sufficient to bring about adsorption or absorption of vanadium. Particular techniques for preparing the additive are described in U.S. Pat. No. 6,482,315, the contents of which are incorporated herein by reference.

As indicated earlier, the cracking catalyst composition of the present invention is especially useful in conventional FCC processes where hydrocarbon feedstocks containing organic sulfur compounds are cracked into lower molecular weight compounds, such as gasoline, in the absence of added hydrogen. Typical FCC processes entail cracking a hydrocarbon feedstock in a cracking reactor or reactor stage in the presence of fluid cracking catalyst particles to produce liquid and gaseous product streams. The product streams are removed and the catalyst particles are subsequently passed to a regenerator stage where the particles are regenerated by exposure to an oxidizing atmosphere to remove contaminant. The regenerated particles are then circulated back to the cracking zone to catalyze further hydrocarbon cracking. In this manner, an inventory of catalyst particles is circulated between the cracking stage and the regenerator stage during the overall cracking process.

The invention can be added to the FCCU without changing the mode of operating the aforementioned process. The catalyst particles may be added directly to the cracking stage, to the regeneration stage of the cracking apparatus or at any other suitable point. The catalyst particles may be added to the circulating catalyst particle inventory while the cracking process is underway or they may be present in the inventory at the start-up of the FCC operation. As an example, the compositions of this invention can added to a FCCU when replacing existing equilibrium catalyst inventory with fresh catalyst. The replacement of equilibrium zeolite catalyst by fresh catalyst is normally done on a cost versus activity basis. The refiner usually balances the cost of introducing new catalyst to the inventory with respect to the production of desired hydrocarbon product fractions. Under FCCU reactor conditions carbocation reactions occur to cause molecular size reduction of petroleum hydrocarbons feedstock introduced into the reactor. As fresh catalyst equilibrates within an FCCU, it is exposed to various conditions, such as the deposition of feedstock contaminants produced during that reaction and severe regeneration operating conditions. Thus, equilibrium catalysts may contain high levels of metal contaminants, exhibit somewhat lower activity, have lower aluminum atom content in the zeolite framework and have different physical properties than fresh catalyst. In normal operation, refiners withdraw small amount of the equilibrium catalyst from the regenerators and replace it with fresh catalyst to control the quality (e.g., its activity and metal content) of the circulating catalyst inventory. When using the preferred embodiment of this invention at this stage of the FCC process, the operator can add much more sulfur reduction component without significant detriment to the activity of the inventory, yet achieve higher sulfur reduction in the gasoline produced by the FCC process.

The FCC process of this invention is conducted in conventional FCC units wherein the reaction temperatures range from about 400° to 700° C. with regeneration occurring at temperatures of from about 500° to 850° C. The particulars will depend on the petroleum feedstock being treated, the product streams desired and other conditions well known to refiners. The FCC catalyst (i.e., inventory) is circulated through the unit in a continuous manner between catalytic cracking reaction and regeneration while maintaining the equilibrium catalyst in the reactor.

The effect of the present catalyst composition and process of using the same is to reduce the sulfur content, especially those associated with thiophene, substituted or unsubstituted, benzothiophene, and their derivatives of the light products (e.g. those of the gasoline fraction having a boiling point of up to about 430° F. or 220° C.) obtained from a FCCU. The exact amount of sulfur compounds contained in the gasoline fractions produced by conventional FCC process depends on the sulfur content of the feed that is subjected to FCC processing. Gasoline cuts from FCC processes normally have a boiling point ranging up to 430° F. (220° C.). In general, the sulfur content of the whole of FCC gasoline cut is over 50 ppm by weight and usually over 300 ppm by weight. When the end point of the cut is greater than 200° C., the sulfur content can be over 1000 ppm by weight. Removal of the sulfur contaminants is beneficially accomplished when using the FCC catalyst composition of the present invention. The degree of reduction readily achieved depends on the amount of Lewis Acid component in the catalyst composition. For compositions having amounts of about 10% Lewis Acid, sulfur reduction can be at least about 15 weight percent when compared to product obtained with conventional FCC catalyst that has no Lewis Acid-containing component. In other embodiments, sulfur reduction can be at least 20 weight percent. As shown in the Examples later below, embodiments containing a Lewis Acid component comprising about 50% Lewis Acid component more commonly achieve a reduction of at least about 40 weight percent of organo-sulfur components. The sulfur is generally converted to inorganic form and released as hydrogen sulfide. This material can be readily recovered in the manner as is conventional for FCC processes. The increased load of increased hydrogen sulfide recovery is not deemed critical nor economically detrimental when taking into consideration the improved, reduced sulfur content light hydrocarbon products formed. The sulfur reduction performance described above is based on tests conducted in a Davison Circulating Riser unit, referenced later in the Examples below.

The FCC process of the present invention produces gasoline that has a substantially reduced amount of organosulfur content than normally achieved via conventional processing with zeolite catalysts, and even reduced over that achieved with prior additives that have relatively high sodium levels. Indeed, the Examples below show that the sulfur reduction activity of the invention can be maintained over longer periods of time compared to catalyst compositions having relatively high levels of sodium, e.g., greater than 0.2% by weight sodium. Accordingly, the catalyst composition of this invention provides for a method of reducing sulfur in gasoline from FCC naphtha streams, wherein the method comprises (a) preparing any one of the aforementioned catalyst compositions, (b) adding the composition to the FCCU's catalyst inventory, (c) introducing the inventory into the reaction zone of the FCCU at amounts sufficient to convert hydrocarbon feedstock entering the reaction zone, and (d) routing the catalyst inventory to the FCCU's regeneration stage to remove hydrocarbon deposits from the inventory, e.g., coke. The solids in step (d) are then oxidatively regenerated to produce hot, regenerated catalyst which is returned to the catalytic cracking zone in proportion to maintain the equilibrium conditions.

For the purposes herein, and/or the Examples below, and unless otherwise stated, the terms below have the definitions indicated.

"Fresh" fluid cracking catalyst is catalyst composition, as manufactured and sold.

"Equilibrium" fluid cracking catalyst is the inventory of circulating catalyst composition in an FCC unit once it has reached a steady state within the environment of the FCCU. "Equilibrium catalyst", "spent catalyst" (that taken from an FCC unit); and "regenerated catalyst" (catalyst leaving the regeneration unit) shall be deemed equivalent.

"Simulated Equilibrium" refers to fluid cracking catalyst that has been steam treated in the laboratory to simulate an equilibrium cracking catalyst of an FCCU. One such laboratory procedure for attaining simulated equilibrium is to steam fresh catalyst at 1500° F. (816° C.) for 4 hours under one atmosphere of steam. Such treatment simulates catalyst deactivation that is substantially the same as that of an equilibrium catalyst in a FCC unit once it has reached a steady state within the environs of a FCCU. Another deactivation procedure is called CPS (cyclic propylene steam) deactivation which uses propylene and air to simulate the REDOX process in addition to the steaming deactivation effect (See American Chemical Society Symposium Series, No. 634, Page 171-183 (1996).

"Kinetic conversion activity" of a fluid cracking catalyst at a simulated equilibrium state is as measured according to ASTM microactivity test (ASTM 5154). In particular, it is measured at a catalyst to oil weight ratio of 4 with a typical gas oil feed by the percentage conversion of heavy hydrocarbon feedstock (i.e. the percentage of product formed from a unit of feedstock wherein product is coke and formed material having a boiling point of up to 430° F. (221° C.)) divided by 100 minus the percentage conversion of a heavy feedstock, as defined in Table 14.

The following examples are given for illustrative purposes only and are not meant to be a limitation on the claims appended hereto. All parts and percentages are by weight unless otherwise indicated.

Further, any range of numbers recited in the present specification or claims, such as that representing a particular set of properties, units of measure, conditions physical states or percentages, is intended to literally incorporate expressly

Example 1

Effect of Sodium on Performance of Lewis Acid-Based Gasoline Sulfur Reduction Additives Sample 1A: A low $Na_2O$ Lewis Acid component ($Na_2O$~0.01%) was made by impregnating zinc nitrate solution on a low $Na_2O$ alumina base and followed by oven drying and calcining 2 hours at 650° C.

Sample 1B: 10 g of Sample 1A was impregnated with 0.023 g $Na_2CO_3$ dissolved in 6.7 g de-ionized water and followed by oven drying and calcining 2 hours at 650° C.

Sample 1C: 10 g of Sample 1A was impregnated with 0.046 g $Na_2CO_3$ dissolved in 6.7 g de-ionized water and followed by oven drying and calcining 2 hours at 650° C.

All the three samples above were deactivated 4 hours at 1500° F. with 100% steam.

The surface area was measured by $N_2$ BET method and chemical analysis was performed by ion coupled plasma analysis, standardized to NIST standards. The results of the three samples are listed in Table 1 below.

TABLE 1

| | SAMPLE | | |
|---|---|---|---|
| | 1A | 1B | 1C |
| $Na_2O$ (% by weight) | 0.01 | 0.16 | 0.32 |
| ZnO (% by weight) | 9.6 | 9.6 | 10.8 |
| Surface Area (m²/g) | 103 | 98 | 100 |

It is seen that the surface areas, and ZnO contents are similar for the three samples. However, the $Na_2O$ content increased from 0.01% of the sample 1A to 0.16% of the sample 1B and 0.32% of the sample 1C. The three samples were analyzed by pyridine-IR analysis. The IR spectra are illustrated in FIG. 1. It is seen that with the increasing of $Na_2O$ concentration, the strong Lewis peak (1625 cm-1) vs. the weak Lewis Acid peak (1619 cm-1) ratio decreased from 1.26, 0.63 and 0.43.

Figure 2:
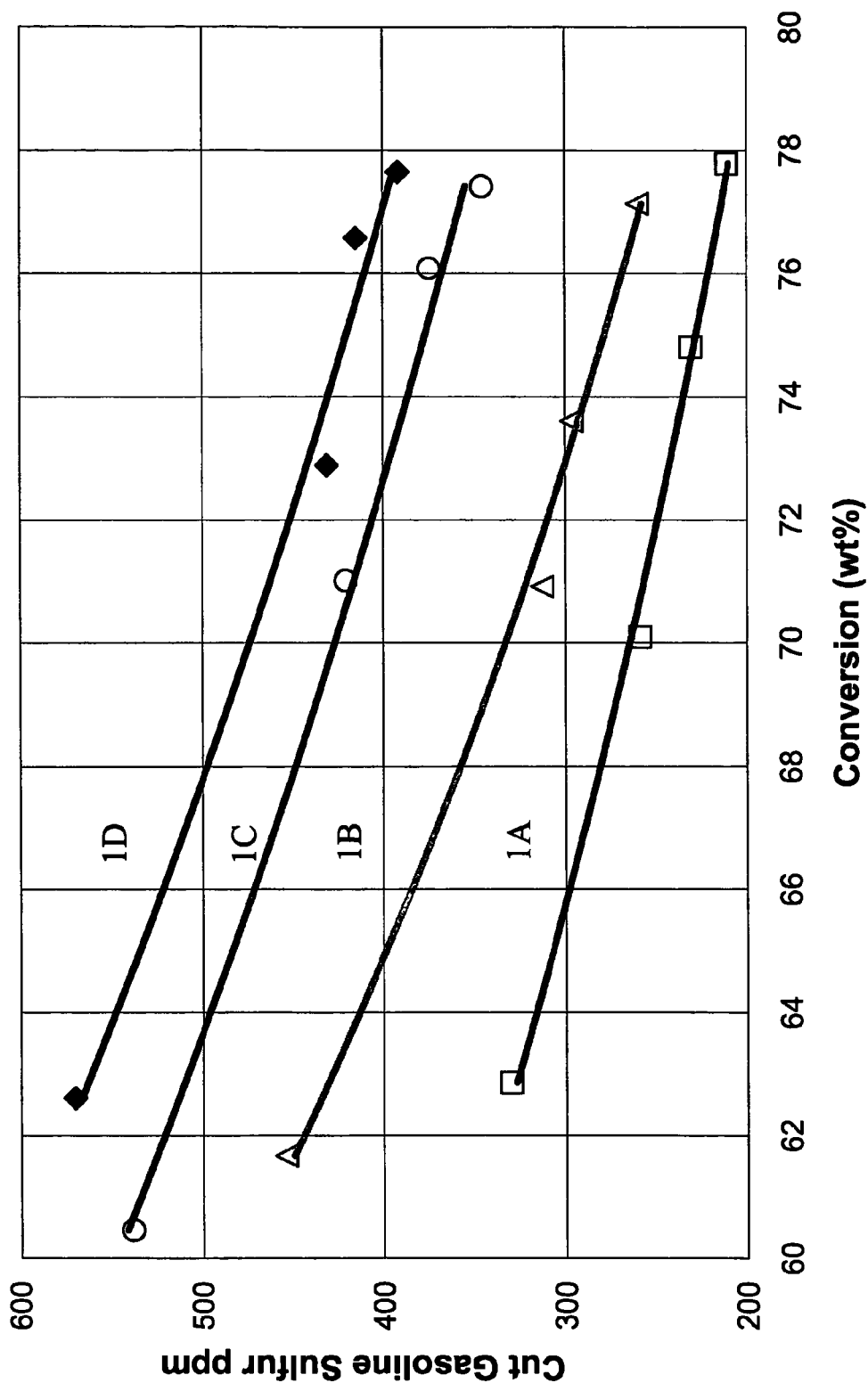
FIG. 2 compares the hydrocarbon conversion and cut gasoline sulfur reduction performance of the invention (Sample 1A of Example 1) versus a base equilibrium catalyst (Sample 1D) and catalyst compositions containing a Lewis Acid component having $Na_2O$ levels of 0.16% (Sample 1 B) and 0.32% (Sample 1C).

All three samples were blended with an equilibrium zeolite-containing catalyst (Ecat) 1D at 15% level and a Micro-Activity Tests (MAT) were conducted thereon according to ASTM D3907 against 1D only. Ecat 1D contains zeolite having a unit cell size of 24.30, and the Ecat composition has a sodium content of 0.27%. The feed properties are those listed for Feed A in Table 14. The products of the cracked feed, sulfur content in the gasoline and sulfur reduction results at 70% conversion are shown in Table 2 below and FIG. 2.

TABLE 2

| | Ecat 1D | Catalyst 1A | Catalyst 1B | Catalyst 1C |
|---|---|---|---|---|
| Catalyst to Oil Ratio | 2.87 | 3.06 | 3.17 | 3.12 |
| CRACKED PRODUCTS CONTENT (WT. %) | | | | |
| Hydrogen | 0.05 | 0.09 | 0.06 | 0.06 |
| Tot C1 + C2 | 1.62 | 1.53 | 1.54 | 1.56 |

TABLE 2-continued

| | Ecat 1D | Catalyst 1A | Catalyst 1B | Catalyst 1C |
|---|---|---|---|---|
| Total C3's | 5.92 | 5.72 | 5.80 | 5.89 |
| Total C4s | 11.10 | 11.03 | 11.06 | 11.29 |
| Gasoline | 47.92 | 48.02 | 48.06 | 47.68 |
| LCO | 24.62 | 24.86 | 24.66 | 24.45 |
| Bottoms | 4.66 | 4.56 | 4.72 | 4.73 |
| Coke | 2.56 | 2.96 | 2.82 | 2.69 |
| GASOLINE SULFUR CONTENT (PPM) | | | | |
| Thiophene | 49 | 32 | 35 | 42 |
| MethylThiophenes | 118 | 60 | 79 | 105 |
| TetrahydroThiophene | 21 | 1 | 4 | 13 |
| C2-Thiophenes | 125 | 54 | 79 | 112 |
| Thiophenol | 32 | 43 | 30 | 28 |
| C3-Thiophenes | 65 | 35 | 49 | 62 |
| MethylThiophenol | 84 | 104 | 81 | 81 |
| C4-Thiophenes | 90 | 81 | 84 | 89 |
| BenzoThiophene | 353 | 331 | 349 | 347 |
| Light Cut Sulfur | 317 | 147 | 199 | 276 |
| Heavy Cut Sulfur | 155 | 117 | 133 | 150 |
| Cut Gasoline Sulfur | 474 | 265 | 333 | 427 |
| Total Sulfur | 843 | 605 | 697 | 786 |
| SULFUR REDUCTION, % | | | | |
| Light Cut Sulfur | | 54 | 37 | 13 |
| Heavy Cut Sulfur | | 24 | 14 | 3 |
| Cut Gasoline Sulfur | | 44 | 30 | 10 |
| Total Sulfur | | 28 | 17 | 7 |

The gasoline sulfur concentration was analyzed by an Agilent 6890 gas chromatograph with an atomic emission detector G2350A (sulfur GC-AED) using techniques similar to those described in Albro et al., "Quantitative Determination of Sulfur Compounds in FCC Gasolines By AED-A study of the Effect of Catalyst Type and Catalytic Conditions on Sulfur Distribution", *Journal of High Resolution Chromatography*, Vol. 16, January 1993. To reduce experimental errors in the sulfur concentration associated with fluctuations in distillation cut point of gasoline, the sulfur species ranging from thiophene to C4-thiophene in syncrude (excluding benzothiophene and higher boiling S species) were quantified and the sum was defined as "cut gasoline sulfur". Similarly, sulfur species ranging from thiophene to C2-thiophene was defined as "light cut gasoline sulfur" and sulfur species ranging from C3-thiophene to C4-thiophene as "heavy cut gasoline sulfur". When benzothiophene is included in the sulfur report, it is referred to as "total gasoline sulfur".

The cut gasoline sulfur reduction decreased from 44% to 30% and 10% when $Na_2O$ in the Lewis Acid component increased from 0.01% to 0.16% and 0.32%.

Example 2

Effect of $SiO_2$ on Performance of Gasoline Sulfur Reduction Additive

Sample 2A: A low Na Lewis Acid component (Na~0.01%) was made by impregnating zinc nitrate solution on a low $Na_2O$ alumina base and followed by oven drying and calcining 2 hours at 650° C. The alumina base is essentially free of $SiO_2$, i.e., less than 0.4% by weight.

Sample 2B: 40 g of Sample 2A was impregnated with 2.89 g $Si(OC_2H_5)_4$ dissolved in ethanol and followed by oven drying and calcining 2 hours at 650° C.

Sample 2C: 40 g of Sample 2A was impregnated with 5.79 g $Si(OC_2H_5)_4$ dissolved in ethanol and followed by oven drying and calcining 2 hours at 650° C.

Sample 2D: 40 g of Sample 2A was impregnated with 11.57 g $Si(OC_2H_5)_4$ dissolved in ethanol and followed by oven drying and calcining 2 hours at 650° C.

All four samples above were deactivated 4 hours at 1500° F. with 100% steam.

The physical and chemical properties of the four samples are listed in Table 3 below.

TABLE 3

| | Sample | | | |
|---|---|---|---|---|
| | 2A | 2B | 2C | 2D |
| $Na_2O$ (%) | 0.01 | 0.01 | 0.01 | 0.01 |
| $SiO_2$ wt % by Impregnation | 0 | 2 | 4 | 8 |
| ZnO (%) | 11.0 | 11.0 | 11.0 | 11.0 |
| Surface Area ($m^2$/g) | 75 | 87 | 88 | 89 |

Figure 3:
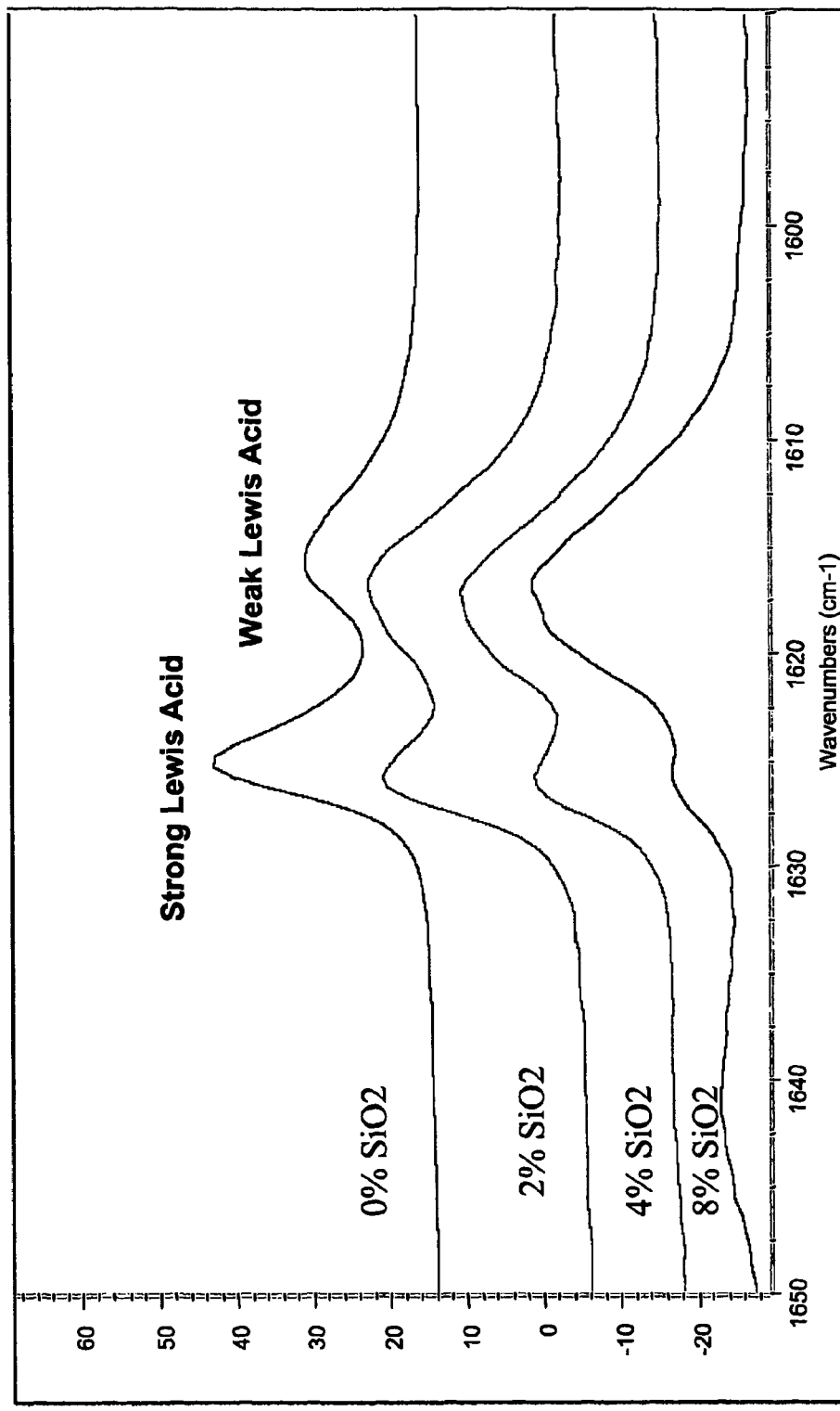
FIG. 3 illustrates the effect of silica on Lewis Acid sites of a Lewis Acid-containing-additive for gasoline sulfur reduction.

It is seen that the surface areas, and ZnO contents are similar for the four samples. However, the $SiO_2$ content increased from about 0% in sample 2A to 2% of the sample 2B, 4% of sample 2C, and 8% of sample 2D. The four samples were analyzed by pyridine-IR analysis. The IR spectra are plotted in FIG. 3. It is seen that with the increasing of $SiO_2$ concentration, the strong Lewis peak (1625 $cm^{-1}$) vs. the weak Lewis Acid peak (1619 $cm^{-1}$) ratio decreased from 1.79, 0.93, 0.66 and 0.35.

Figure 4:
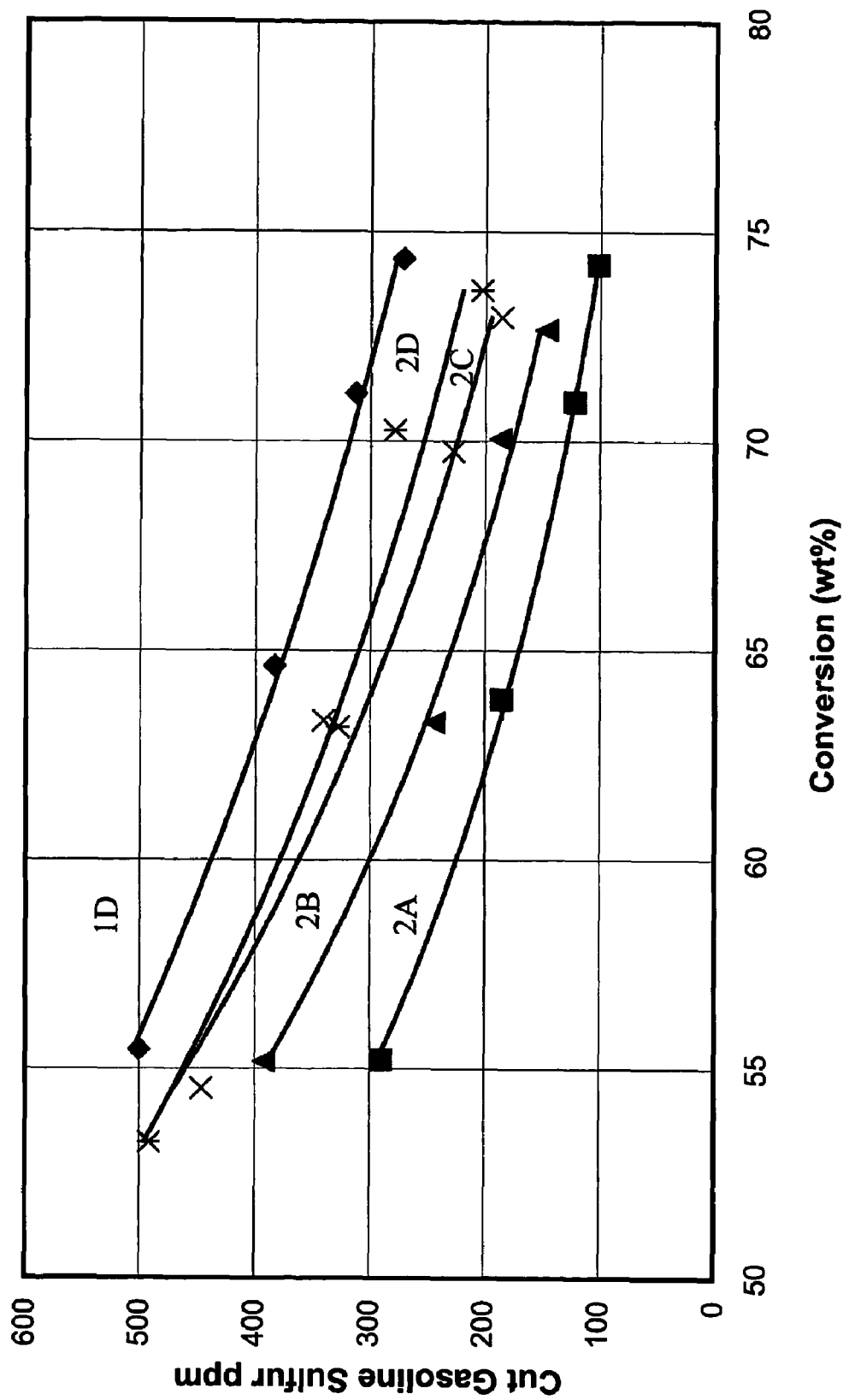
FIG. 4 compares the hydrocarbon conversion and cut gasoline sulfur reduction performance of the invention (Sample 2A of Example 2)) versus catalyst compositions having silica content of 2% by weight or greater.

All four samples were blended with the equilibrium zeolite-containing catalyst 1D at 15% level and tested in MAT against the equilibrium catalyst 1D only using the same feed as the Example 1. The components of the cracked feed, sulfur content in the gasoline and sulfur reduction results at 65% conversion are shown in Table 4 below and FIG. 4.

TABLE 4

| | Ecat 1D | Catatlyst 2A | Catalyst 2B | Catalyst 2C | Catalyst 2D |
|---|---|---|---|---|---|
| Catalyst to Oil Ratio | 3.11 | 3.15 | 3.26 | 3.30 | 3.31 |
| CRACKED PRODUCT CONTENT (WT. %) | | | | | |
| Hydrogen | 0.04 | 0.08 | 0.06 | 0.06 | 0.07 |
| Tot C1 + C2 | 1.26 | 1.25 | 1.22 | 1.24 | 1.26 |
| Total C3's | 4.28 | 4.25 | 4.21 | 4.24 | 4.26 |
| Total C4s | 8.96 | 8.95 | 8.92 | 8.96 | 8.97 |
| Gasoline | 46.88 | 46.73 | 47.00 | 46.87 | 46.80 |
| LCO | 28.29 | 28.54 | 28.80 | 28.68 | 28.43 |
| Bottoms | 5.82 | 5.58 | 5.48 | 5.51 | 5.62 |
| Coke | 2.99 | 3.12 | 3.07 | 3.07 | 3.01 |
| GASOLINE SULFUR CONTENT (PPM) | | | | | |
| Thiophene | 33 | 23 | 25 | 26 | 29 |
| MethylThiophenes | 85 | 41 | 54 | 62 | 70 |
| TetrahydroThiophene | 22 | 1 | 6 | 11 | 14 |
| C2-Thiophenes | 132 | 40 | 71 | 91 | 101 |
| Thiophenol | 12 | 18 | 12 | 13 | 13 |
| C3-Thiophenes | 54 | 24 | 37 | 47 | 48 |
| MethylThiophenol | 38 | 48 | 37 | 38 | 41 |
| C4-Thiophenes | 43 | 38 | 34 | 43 | 44 |
| BenzoThiophene | 251 | 239 | 246 | 229 | 258 |
| Light Cut Sulfur | 275 | 107 | 158 | 192 | 216 |
| Heavy Cut Sulfur | 97 | 63 | 71 | 89 | 92 |
| Cut Gasoline Sulfur | 374 | 170 | 230 | 285 | 310 |
| Total Sulfur | 635 | 423 | 488 | 530 | 580 |

TABLE 4-continued

| | Ecat 1D | Catatlyst 2A | Catalyst 2B | Catalyst 2C | Catalyst 2D |
|---|---|---|---|---|---|
| SULFUR REDUCTION, % | | | | | |
| Light Cut Sulfur | | 61 | 43 | 30 | 21 |
| Heavy Cut Sulfur | | 35 | 26 | 7 | 5 |
| Cut Gasoline Sulfur | | 54 | 38 | 24 | 17 |
| Total Sulfur | | 33 | 23 | 17 | 9 |

The cut gasoline sulfur reduction decreased from 54% to 38%, 24%, and 17% when $SiO_2$ increased from 0% to 2%, 4% and 8%, although it is seen that $Na_2O$ affects sulfur reduction more than $SiO_2$.

Example 3

Effect of Na and $SiO_2$ Transferred from FCC Catalyst in a FCC Unit

A 50 parts batch of highly active zeolite-containing catalyst sample 3A was prepared by adding 55.8 parts (12.5 parts on alumina basis) of alumina chlorohydrol solution to 48.2 parts (37.5 parts on silica alumina basis) of RE-USY zeolite (4% $Na_2O$ and 8.5% $RE_2O_3$-USY) and 66.38 parts of $H_2O$. The mixture was milled in a Drais mill to reduce particle size and spray dried. The spray dried products was calcined and then washed using ammonium sulfate solution to remove soda. The washed catalyst had a $Na_2O$ content of 0.69%.

The highly active zeolite-containing catalyst 3A and the Lewis Acid component 2A above were steamed deactivated separately at 1470° F. using a laboratory simulated deactivation protocol CPS (cyclic propylene steaming) without metals. A 50:50 blend of catalyst 3A and component 2A was tested in a Davison Circulating Riser (DCR) pilot plant against a base catalyst 3B commercially available from W. R. Grace & Co.—Conn. The operation and description of the DCR has been published in the following papers: G. W. Young, G. D. Weatherbee, and S. W. Davey, "Simulating Commercial FCCU Yields With The Davison Circulating Riser (DCR) Pilot Plant Unit," National Petroleum Refiners Association (NPRA) Paper AM88-52; G. W. Young, "Realistic Assessment of FCC Catalyst Performance in the Laboratory," in Fluid Catalytic Cracking: Science and Technology, J. S. Magee and M. M. Mitchell, Jr. Eds. Studies in Surface Science and Catalysis Volume 76, p. 257, Elsevier Science Publishers B. V., Amsterdam 1993, ISBN 0-444-89037-8.

The feed properties are those of Feed B listed in Table 14. The physical and chemical properties of the fresh and steamed catalyst 3A and component 2A, as well as the base catalyst 3B are listed in Table 5.

TABLE 5

| | Catalyst 3A | Component 2A | Catalyst 3B |
|---|---|---|---|
| $Al_2O_3$ wt % | 42.3 | 88.4 | 55.7 |
| $SiO_2$ wt % | 49.8 | 0.5 | 38.1 |
| $Re_2O_3$ wt % | 6.24 | 0.01 | 2.53 |
| $Na_2O$ wt % | 0.69 | 0.02 | 0.29 |
| ZnO wt. % | — | 11.0 | — |

TABLE 5-continued

|  | Catalyst 3A | Component 2A | Catalyst 3B |
|---|---|---|---|
| CPS @ 1470 F. No Metals |  |  |  |
| Surface Area m²/g | 257 |  | 163 |
| ZSA m²/g | 200 |  | 87 |
| MSA m²/g | 57 |  | 76 |
| Unit Cell Size | 24.33 |  |  |

Figure 5:
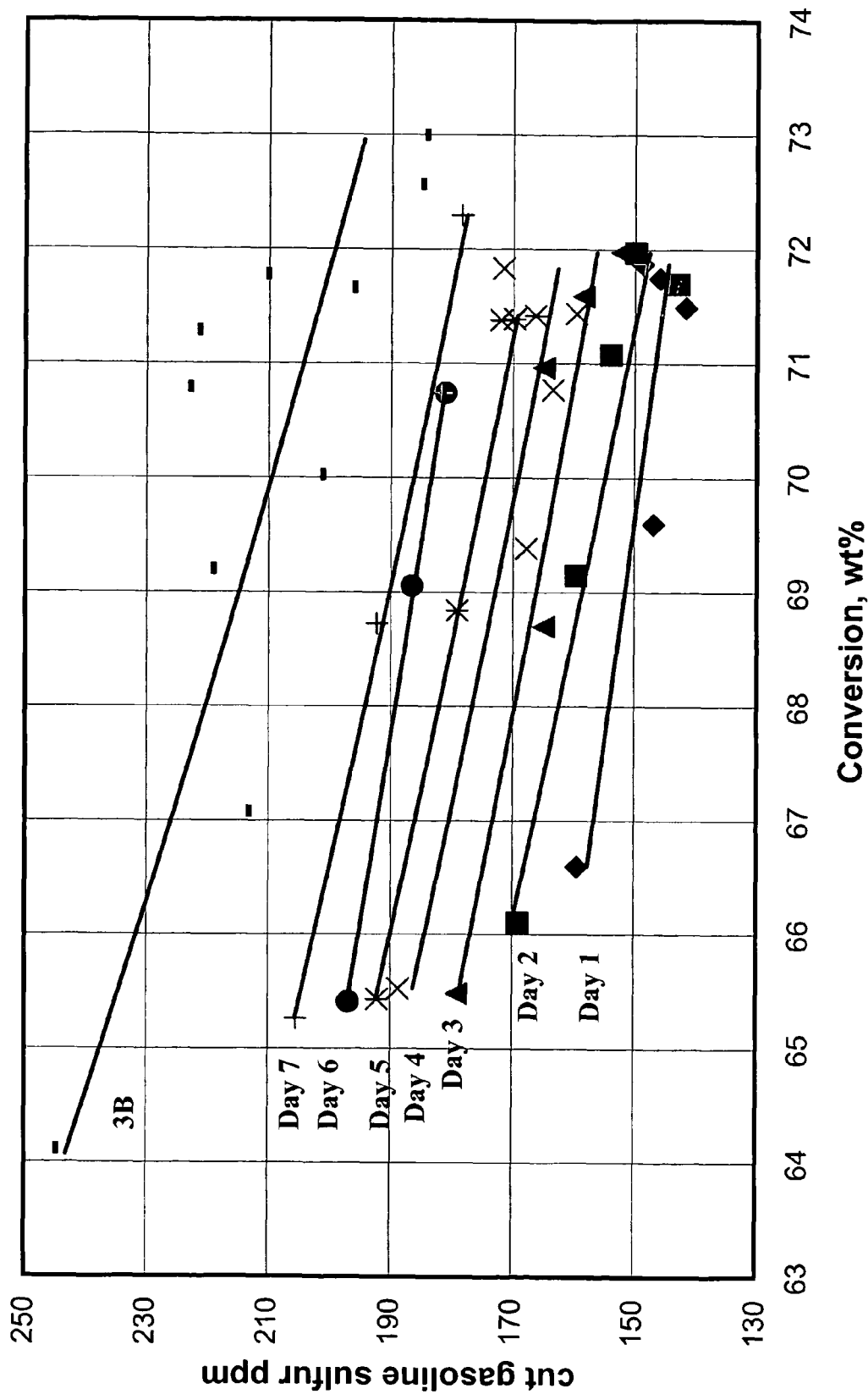
FIG. 5 the hydrocarbon conversion and cut gasoline sulfur reduction of a catalyst composition having a relatively high amount of sodium originating from a zeolite-containing catalyst. The catalyst illustrated in this Figure illustrates a catalyst described in U.S. Pat. No. 6,635,168.

The $Na_2O$ content in Lewis Acid component 2A is 0.02%, while the $Na_2O$ content in the zeolite-containing catalyst 3A is 0.69%. The $Na_2O$ content for the blend (50:50) of 3A and 2C was 0.36%. The study was conducted continuously for 7 days to look for the deactivation of the Lewis Acid component. Each day, a sample was taken and analyzed for yields and gasoline sulfur concentration. The components of the cracked feed, sulfur content in the gasoline and sulfur reduction results at 69% conversion are listed in Table 6 below and shown in FIG. 5.

TABLE 6

| | Catalyst 3B | Day 1 | Day 2 | Day 3 | Day 4 | Day 5 | Day 6 | Day 7 |
|---|---|---|---|---|---|---|---|---|
| CRACKED PRODUCTS CONTENT (WT %) | | | | | | | | |
| Activity | 6.35 | 7.58 | 8.52 | 8.89 | 9.05 | 8.62 | 8.51 | 8.81 |
| H2 Yield wt % | 0.03 | 0.30 | 0.19 | 0.13 | 0.09 | 0.06 | 0.06 | 0.05 |
| C1 + C2's wt % | 1.89 | 1.85 | 1.77 | 1.69 | 1.66 | 1.63 | 1.63 | 1.63 |
| Total C3 wt % | 4.87 | 4.49 | 4.42 | 4.40 | 4.56 | 4.37 | 4.36 | 4.36 |
| Total C4 wt % | 9.19 | 8.42 | 8.55 | 8.67 | 8.93 | 8.69 | 8.58 | 8.66 |
| Gasoline wt % | 50.34 | 49.52 | 50.13 | 50.46 | 50.22 | 50.94 | 51.20 | 51.04 |
| LCO wt % | 24.03 | 22.93 | 22.96 | 23.31 | 23.26 | 23.41 | 23.41 | 23.45 |
| Bottoms wt % | 6.97 | 8.07 | 8.04 | 7.69 | 7.74 | 7.59 | 7.59 | 7.55 |
| Coke wt % | 2.52 | 4.23 | 3.75 | 3.44 | 3.35 | 3.11 | 2.98 | 3.07 |
| H2S Yield | 0.15 | 0.19 | 0.19 | 0.20 | 0.19 | 0.19 | 0.18 | 0.19 |
| GASOLINE SULFUR CONTENT (PPM) | | | | | | | | |
| Thiophenes | 21 | 15 | 16 | 16 | 17 | 18 | 17 | 18 |
| Methylthiophenes | 52 | 37 | 38 | 40 | 42 | 41 | 43 | 44 |
| Tetrahydrothiophene | 7 | 0 | 1 | 2 | 3 | 3 | 4 | 4 |
| C2-thiophenes | 67 | 40 | 42 | 47 | 48 | 52 | 54 | 59 |
| Thiophenol | 7 | 8 | 9 | 8 | 7 | 5 | 6 | 6 |
| C3-thiophenes | 35 | 25 | 29 | 29 | 28 | 34 | 34 | 34 |
| Methylthiophenol | 30 | 31 | 34 | 33 | 29 | 25 | 27 | 26 |
| C4-thiophenes | 37 | 30 | 34 | 33 | 29 | 31 | 34 | 31 |
| Benzothiophene | 65 | 66 | 66 | 68 | 67 | 62 | 63 | 64 |
| Light Cut Sulfur | 146 | 92 | 97 | 105 | 109 | 114 | 118 | 125 |
| Heavy Cut Sulfur | 72 | 55 | 63 | 62 | 57 | 64 | 68 | 65 |
| Cut Gasoline Sulfur | 218 | 147 | 161 | 167 | 167 | 179 | 187 | 190 |
| Total Sulfur | 283 | 213 | 226 | 235 | 233 | 241 | 250 | 255 |
| % SULFUR REDUCTION | | | | | | | | |
| Light Cut Sulfur |  | 37% | 34% | 28% | 25% | 22% | 19% | 15% |
| Heavy Cut Sulfur |  | 24% | 12% | 14% | 20% | 10% | 5% | 10% |
| Cut Gasoline Sulfur |  | 32% | 26% | 24% | 24% | 18% | 14% | 13% |
| Total Sulfur |  | 25% | 20% | 17% | 18% | 15% | 12% | 10% |

It is seen that the cut gasoline sulfur reduction started at 32% for day 1 and ended up at 13% for day 7 against the base case. This result indicates that the Lewis Acid component was deactivated during the 7 days of operation.

During the study, a small catalyst sample was also taken out in each day. For each catalyst sample, the Lewis Acid component 2A and the zeolite-containing catalyst 3A were separated by sink/float separation based on skeletal density of the cracking catalyst and the Lewis Acid component. The separation was conducted using techniques similar to those disclosed by Palmer et al., *Appl. Catalysis*, Vol. 35, pp. 217-235 (1987), and Beyerlein et al., *Fluid Catalytic Cracking II-Concepts in Catalyst Design*; Occelli, M. L., Ed. ACS Symposium Series 452, American Chemical Society: Washington, D.C., pp. 109-143 (1991). The chemical properties of the catalyst blends and separated Lewis Acid components and zeolite-containing catalyst are listed in Table 7 below.

TABLE 7

|  | Catalyst 3B | Day 1 | Day 2 | Day 3 | Day 4 | Day 5 | Day 6 | Day 7 |
|---|---|---|---|---|---|---|---|---|
| Catalyst Blends |  |  |  |  |  |  |  |  |
| $Al_2O_3$ wt % | 65.8 | 67.6 | 66.8 | 66.3 | 67.7 | 65.5 | 64.6 | 67.1 |
| $Re_2O_3$ wt % | 3.16 | 3.09 | 2.81 | 3.03 | 2.94 | 2.81 | 2.94 | 3.02 |
| $Na_2O$ wt % | 0.32 | 0.31 | 0.30 | 0.31 | 0.29 | 0.30 | 0.30 | 0.29 |
| $SO_4$ wt % | 0.12 | 0.25 | 0.25 | 0.26 | 0.21 | 0.20 | 0.17 | 0.15 |
| ZnO wt % | 5.15 | 5.13 | 5.50 | 5.09 | 5.19 | 5.33 | 4.95 | 5.12 |
| Separated Lewis Acid Components |  |  |  |  |  |  |  |  |
|  |  | Sink | Sink | Sink | Sink | Sink | Sink | Sink |
| Wt % of Sink |  | 49% | 55% | 53% | 54% | 54% | 54% | 53% |
| $Al_2O_3$ wt % |  | 88.6 | 89.2 | 91 | 86.3 | 89.4 | 84.7 | 90.9 |
| $SiO_2$ wt % |  | 0.9 | 1.3 | 1.5 | 1.7 | 1.9 | 2 | 2.4 |
| $Na_2O$ wt % |  | 0.02 | 0.04 | 0.06 | 0.07 | 0.09 | 0.09 | 0.09 |
| ZnO wt % |  | 9.73 | 9.52 | 9.78 | 9.45 | 9.73 | 9.05 | 9.96 |
| Separated Catalyst Components |  |  |  |  |  |  |  |  |
|  |  | Float | Float | Float | Float | Float | Float | Float |
| Wt % of Float |  | 51% | 45% | 47% | 46% | 46% | 46% | 47% |
| $Al_2O_3$ wt % |  | 46 | 44.6 | 43.8 | 43.5 | 44.2 | 43.2 | 44.3 |
| $SiO_2$ wt % |  | 48.3 | 49.1 | 49.4 | 48.8 | 48.4 | 48.7 | 48.4 |
| $Re_2O_3$ wt % |  | 6 | 6.25 | 6.24 | 6.14 | 6.31 | 6.16 | 6.21 |
| $Na_2O$ wt % |  | 0.61 | 0.61 | 0.57 | 0.56 | 0.56 | 0.55 | 0.55 |
| $SO_4$ wt % |  | 0.27 | 0.24 | 0.23 | 0.22 | 0.22 | 0.23 | 0.24 |
| ZnO wt % |  | 0.5 | 0.31 | 0.34 | 0.31 | 0.31 | 0.34 | 0.33 |

Figure 6:
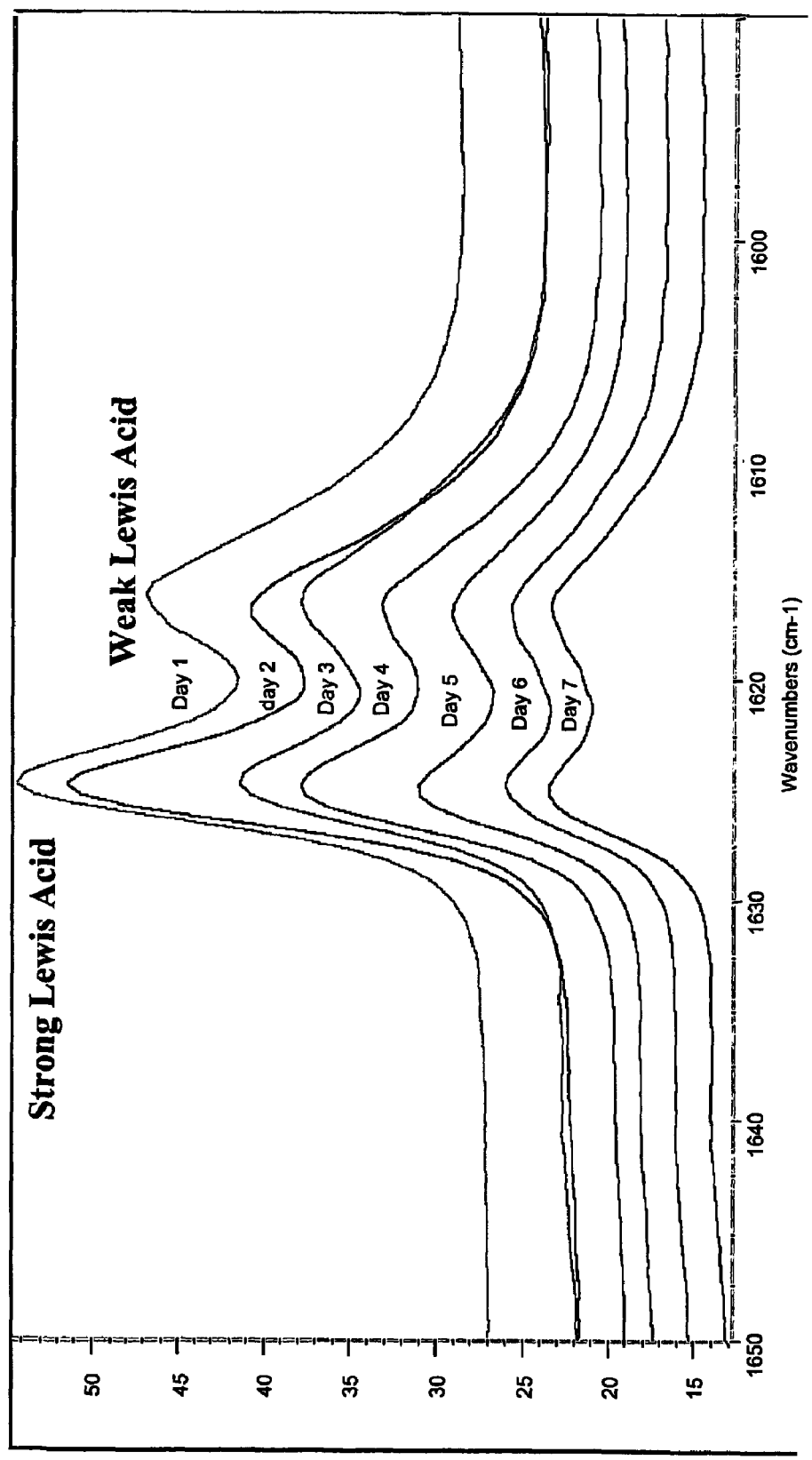
FIG. 6 illustrates that sodium and silica originating from a zeolite catalyst particle can affect the Lewis Acid sites on a particle that is separate from the catalyst particle.

It is seen that in the 7th day about 0.09% $Na_2O$ and about 2.4% $SiO_2$ were transferred to the Lewis Acid component from the zeolite catalyst. Pyridine-IR spectra of the Lewis Acid components are plotted in FIG. 6. It is seen that the ratio of strong Lewis Acid peak vs. the weak Lewis Acid peak decreased from the first day to the seventh day. These results are in agreement with $Na_2O$ and $SiO_2$ affecting the sulfur reduction properties of the invention as shown in the Examples 1 and 2.

Example 4

Ultra-Low $Na_2O$ and Highly Active Catalysts

Catalyst 4A

A 12000 parts batch was prepared by adding 13043 parts (3000 parts on alumina basis) of aluminum chlorohydrol to 28409 parts (9000 parts on silica alumina basis), of RE-USY zeolite (4% $Na_2O$ and 8.5% $RE_2O_3$) slurry. The mixture was milled in a Drais mill to reduce particle size and spray dried. The spray dried product was calcined and then washed using ammonium sulfate solution to remove soda. The washed catalyst has a $Na_2O$ content of 0.75%.

Catalyst 4B

A 10000 parts batch was prepared by adding 10870 parts (2500 parts on alumina basis) of aluminum chlorohydrol to 22894 parts (7500 parts on silica alumina basis) of RE-USY (1% $Na_2O$ on RE-USY) zeolite slurry. The mixture was milled in a Drais mill to reduce particle size and spray dried. The spray dried products were then calcined and then washed using ammonium sulfate solution to remove soda. The washed catalyst has a $Na_2O$ content of 0.19%.

Catalyst 4C

The catalyst 4B above was dried at 200° C. over night and then washed again using ammonium sulfate solution to remove soda. The final product has a $Na_2O$ content of 0.04%.

The physical and chemical properties of the three catalysts are listed on Table 8 below.

TABLE 8

|  | Catalyst 4A | Catalyst 4B | Catalyst 4C |
|---|---|---|---|
| $Al_2O_3$ wt % | 40.3 | 40.9 | 39.2 |
| $Re_2O_3$ wt % | 6.54 | 6.14 | 5.56 |
| $Na_2O$ wt % | 0.75 | 0.19 | 0.04 |
| $SO_4$ wt % | 2.51 | 3.09 | 1.82 |
| Surface Area $m^2/g$ | 550 | 552 | 605 |
| ZSA $m^2/g$ | 472 | 462 | 557 |
| MSA $m^2/g$ | 78 | 90 | 48 |
| Unit Cell Size Å | 24.63 | 24.63 | 24.64 |

Three catalyst blends were made by individually blending the zeolite-containing catalysts 4A, 4B and 4C above with Lewis Acid (Zn) containing component 4D (prepared according to methods described earlier and the analysis of which is described below in Table 9) at a ratio of 85:15. The three catalyst blends were then steamed 24 hours at 1420° F. using 100% steam. The sodium content of the blends containing 4A, 4B, and 4C were 0.65%, 0.17%, and 0.04%, respectively. Sink/float separations were conducted for all the blends after steaming to separate out the 4D component from the zeolite-containing catalysts. The physical and chemical properties of each component, as well as component 4D steamed separately, are listed on Table 9 below.

TABLE 9

|  | Base Case Conponent | Separated Lewis Acid Components | | |
|---|---|---|---|---|
|  | 4D | Blend 4C/Sink | Blend 4B/Sink | Blend 4A/Sink |
| % Sink |  | 15.6 | 15.0 | 16.1 |
| $SiO_2$ | 0.52 | 6.56 | 6.74 | 6.67 |
| $Na_2O$ | 0.07 | 0.04 | 0.10 | 0.21 |
| $Al_2O_3$ | 81.16 | 83.23 | 83.92 | 84.40 |
| ZnO | 9.54 | 6.23 | 5.79 | 5.98 |

|  | Separated Catalyst Components | | |
|---|---|---|---|
|  | Blend 4C/Float | Blend 4B/Float | Blend 4A/Float |
| $Al_2O_3$ | 40.22 | 41.48 | 39.99 |
| $Na_2O$ | 0.08 | 0.18 | 0.68 |
| $Re_2O_3$ | 5.79 | 6.05 | 6.19 |
| ZnO | 0.65 | 0.85 | 0.82 |
| SA | 311 | 255 | 207 |
| ZSA | 252 | 201 | 154 |
| MSA | 59 | 54 | 53 |

The results suggest that there were no $Na_2O$ transferred to component 4D from zeolite 4C while about ~0.03%/$Na_2O$ and ~0.15% $Na_2O$ transferred to the component 4D from the zeolite-containing 4B and 4A, respectively. All three zeolite catalysts transferred about 6.6% $SiO_2$ to the component 4D. All three catalyst compositions were tested in a Micro-Activity Test (MAT) against the equilibrium catalyst 1D from Example 1. The Products of the cracked feed, sulfur content in the gasoline and sulfur reduction results at 77% conversion are shown in Table 10 below and in FIG. 7. The cut gasoline sulfur reductions range from 18% of the blend 4C, 14% of the blend 4B, and 0% of the blend 4A. These results indicate that the lower $Na_2O$ transfer from the catalyst 4B and 4C help to preserve sulfur reduction activity of the Lewis Acid containing additive.

TABLE 10

|  | Ecat 1D | Blend 4A | Blend 4B | Blend 4C |
|---|---|---|---|---|
| Catalyst to Oil Ratio | 2.69 | 4.63 | 3.76 | 3.31 |
| CRACKED PRODUCT CONTENT (WT. %) |  |  |  |  |
| Hydrogen | 0.04 | 0.16 | 0.18 | 0.16 |
| Tot C1 + C2 | 2.09 | 2.35 | 2.40 | 2.25 |
| Total C3's | 5.81 | 6.21 | 6.28 | 5.98 |
| Total C4s | 11.44 | 12.18 | 12.30 | 11.80 |
| Gasoline | 52.42 | 51.76 | 49.75 | 50.38 |
| LCO | 19.76 | 20.14 | 19.19 | 19.47 |
| Bottoms | 3.01 | 3.31 | 3.33 | 3.06 |
| Coke | 4.71 | 4.58 | 5.53 | 5.73 |
| GASOLINE SULFUR CONTENT (PPM) |  |  |  |  |
| Thiophene | 46 | 40 | 41 | 41 |
| MethylThiophenes | 86 | 91 | 78 | 71 |
| TetrahydroThiophene | 19 | 11 | 9 | 10 |
| C2-Thiophenes | 75 | 86 | 65 | 60 |
| Thiophenol | 39 | 33 | 37 | 40 |
| C3-Thiophenes | 28 | 36 | 22 | 18 |
| MethylThiophenol | 86 | 73 | 77 | 84 |

TABLE 10-continued

|  | Ecat 1D | Blend 4A | Blend 4B | Blend 4C |
|---|---|---|---|---|
| C4-Thiophenes | 47 | 52 | 46 | 47 |
| BenzoThiophene | 321 | 401 | 398 | 368 |
| AlkylBenzoThiophenes | 69 | 69 | 65 | 64 |
| Light Cut Sulfur | 229 | 228 | 195 | 184 |
| Heavy Cut Sulfur | 77 | 88 | 68 | 67 |
| Cut Gasoline Sulfur | 307 | 316 | 265 | 252 |
| SULFUR REDUCTION, wt. % |  |  |  |  |
| Light Cut Sulfur |  | 0 | 15 | 20 |
| Heavy Cut Sulfur |  | −14 | 11 | 13 |
| Cut Gasoline Sulfur |  | −3 | 14 | 18 |

Figure 7:
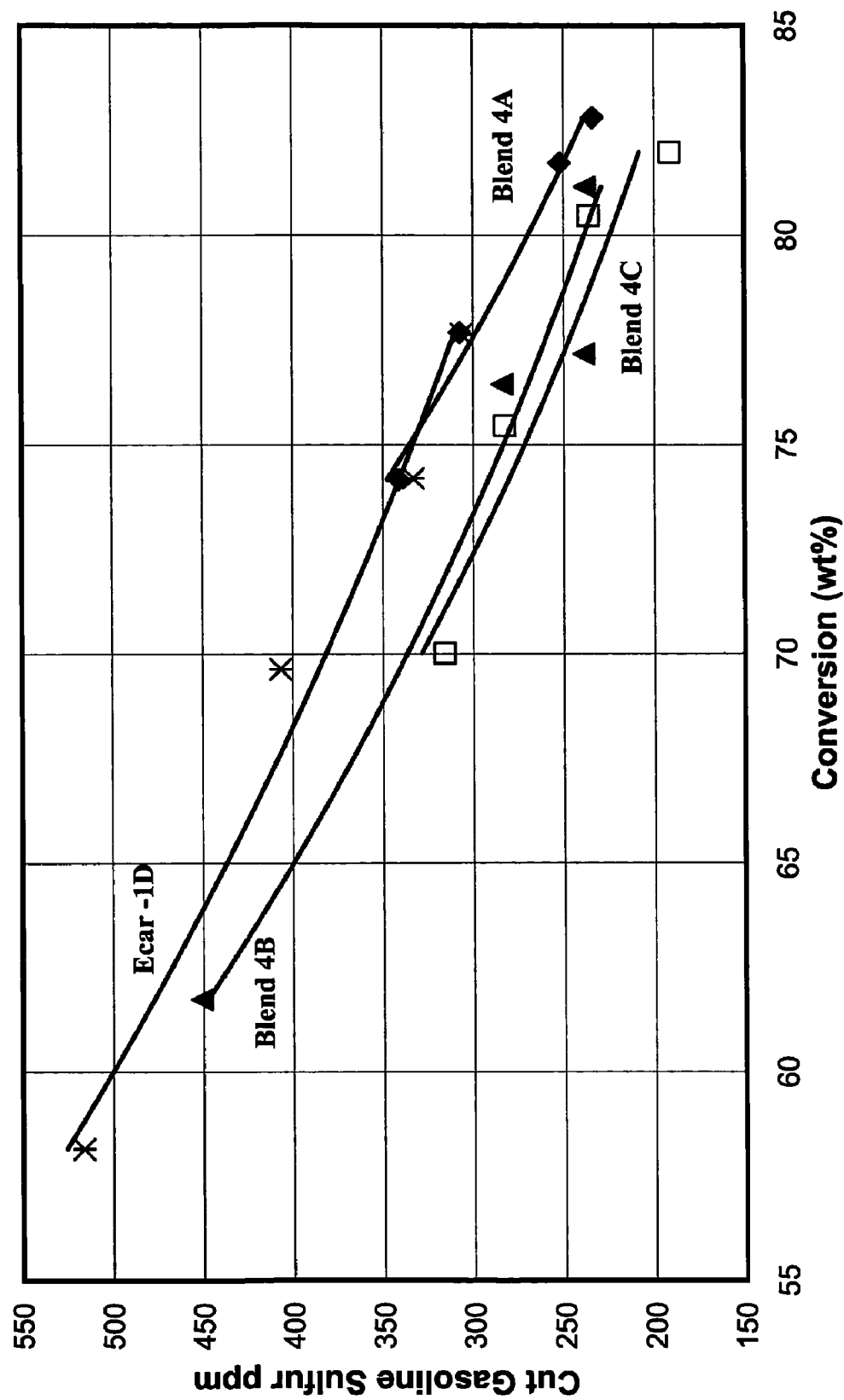
FIG. 7 compares the hydrocarbon conversion and cut gasoline sulfur reduction performance of the invention (Sample 4B and 4C of Example 4) versus catalyst composition Sample 4A) that transferred 0.15 wt % $Na_2O$ to the Lewis Acid component.

The negative values reported in the SULFUR REDUCTION section of Table 10 were interpolated from data appearing in FIG. 7. The negative values in theory indicate that sulfur content increased by the amount shown and at a conversion rate of 77%. However, it is not believed that this data reflects a significant increase in sulfur, if indeed it reflects an actual increase in sulfur at all.

Example 5

Highly Active Zeolite-Containing Catalyst 5A

A RE-USY, containing less than 1 wt % $Na_2O$ and 8% $RE_2O_3$, was exchanged twice with rare earth chloride to give a USY zeolite that contained greater than 18 wt % $RE_2O_3$ and less than 0.5 wt % $Na_2O$.

The catalyst was prepared by blending 9000 grams (dry basis) of RE-USY zeolite with 13 kg of an aluminum chlorohydrol solution (23% solids). The resulting slurry was milled in a Drais mill and then spray dried in a Bowen spray dryer. The spray dried particles were calcined for 2 hours at 1100° F. The resulting catalyst had a surface area of 559 $m^2/g$, a $RE_2O_3$ content of 13.9 wt % and a $Na_2O$ content of 0.24 wt %.

Vanadium-Containing Additive 5B

A spray dried $Al_2O_3$ particle was prepared by peptizing a psuedoboehmite $Al_2O_3$ slurry with HCl, milling it with a Drais mill and then spray drying the milled slurry. The resulting spray dried alumina was calcined for 1 hour at 800° C. The spray dried $Al_2O_3$ was impregnated with a vanadyl sulfate solution. The impregnated material was dried at 100° C. and then calcined for 2 hours at 540° C. The resulting additive had a surface area of 92 $m^2/g$, a vanadium content of 5.52 wt %, sulfate content of 11.42% and a $Na_2O$ content of 0.03 wt %.

The high activity zeolite-containing catalyst 5A and the Lewis Acid component 2A above were steamed separately by employing the CPS protocol at 1450° F. without metals. A 25:70:5 blend of 5A, 2A, and 5B was tested in a DCR unit against catalyst 3B above. The feed properties are those listed for Feed C in Table 14. The physical and chemical properties of the fresh and steamed 5A, 2A, and 5C as well as 3B are listed in Table 11.

TABLE 11

| | Catalyst 5A | Catalyst 3B | Component 2A | Additive 5B |
|---|---|---|---|---|
| Surface Area $m^2/g$ | 559 | 303 | 94 | 92 |
| ZSA $m^2/g$ | 492 | 127 | 0 | 0 |
| MSA $m^2/g$ | 67 | 176 | 94 | 92 |
| Unit Cell Size Å | 24.62 | 24.58 | — | — |
| CPS @ 1450° F. No Metals | | | | |
| $Al_2O_3$ wt % | 36.3 | 54.8 | 86.1 | 85.3 |
| $SiO_2$ wt % | 51.4 | 41.5 | 0.2 | 0.2 |
| $Re_2O_3$ wt % | 13.86 | 2.37 | 0.01 | 0.03 |
| $Na_2O$ wt % | 0.24 | 0.29 | 0.02 | 0.03 |
| $SO_4$ wt % | 0.02 | 0.11 | 0.01 | 11.42 |
| ZnO wt % | 0.04 | 0.01 | 10.67 | 0.04 |
| V wt % | — | — | — | 5.53 |
| Surface Area | 387 | 186 | 75 | |
| ZSA $mg^2/g$ | 338 | 100 | 1 | |
| MSA $mg^2/g$ | 49 | 86 | 74 | |
| Unit Cell Size Å | 24.48 | 24.33 | — | |

Figure 8:
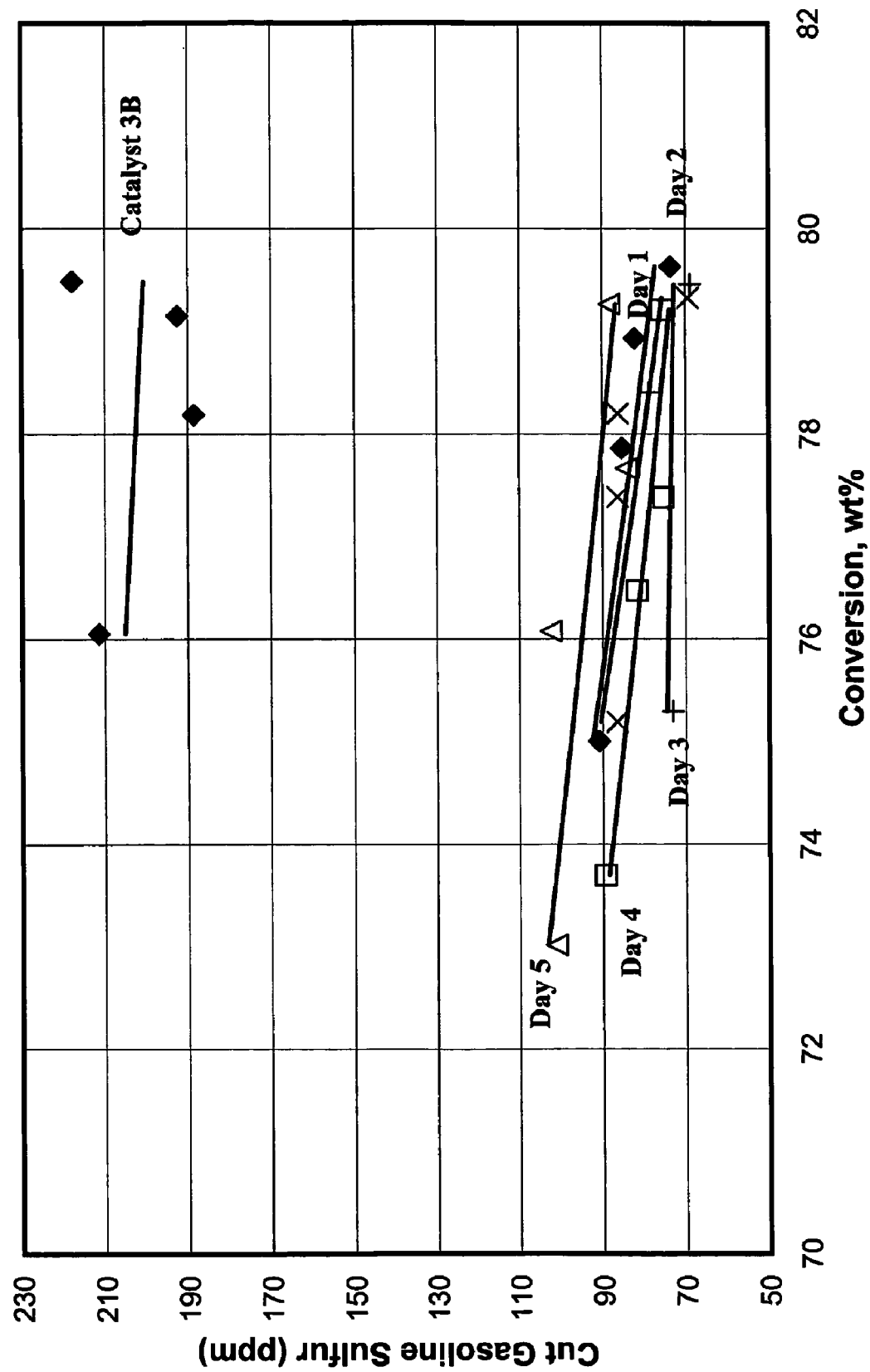
FIG. 8 illustrates the hydrocarbon conversion and cut gasoline sulfur performance of the invention.

The $Na_2O$ content in the Lewis Acid component 2A is 0.02% while the $Na_2O$ content in the zeolite-containing catalyst 5A is 0.24%. The study was conducted continuously for 5 days to look for the deactivation of the Lewis Acid component. Each day, a product was taken and analyzed for yields and gasoline sulfur concentration. The Products of the cracked feed, sulfur content in the gasoline and sulfur reduction results at 78% conversion are listed in Table 12 below and shown in FIG. 8.

TABLE 12

| | Catalyst 3B | Day 1 | Day 2 | Day 3 | Day 4 | Day 5 |
|---|---|---|---|---|---|---|
| CRACKED Product CONTENT (WT.%) | | | | | | |
| Activity | 6.73 | 9.04 | 8.75 | 9.12 | 9.23 | 9.44 |
| $H_2$ Yield wt % | 0.02 | 0.44 | 0.36 | 0.29 | 0.24 | 0.20 |
| C1 + C2's wt % | 2.05 | 2.51 | 2.39 | 2.40 | 2.26 | 2.22 |
| Total C3 wt % | 6.30 | 5.97 | 5.97 | 6.03 | 5.84 | 5.78 |
| Total C4 wt % | 11.79 | 10.59 | 10.82 | 10.90 | 10.86 | 10.73 |
| Gasoline wt % | 53.68 | 50.52 | 51.19 | 51.33 | 52.12 | 52.62 |
| LCO wt % | 17.35 | 16.84 | 16.90 | 16.87 | 16.94 | 17.06 |
| Bottoms wt % | 4.65 | 5.16 | 5.10 | 5.13 | 5.06 | 4.94 |
| Coke wt % | 4.07 | 7.81 | 7.10 | 6.86 | 6.50 | 6.26 |
| $H_2S$ Yield | 0.10 | 0.15 | 0.18 | 0.20 | 0.19 | 0.18 |
| GASOLINE SULFUR CONTENT (PPM) | | | | | | |
| Mercaptans | 39 | 9 | 3 | 2 | 11 | 14 |
| Thiophene | 21 | 12 | 11 | 11 | 11 | 14 |
| MethylThiophenes | 43 | 26 | 25 | 23 | 24 | 24 |
| TetrahydroThiophene | 8 | 0 | 0 | 0 | 0 | 0 |
| C2-Thiophenes | 56 | 29 | 33 | 35 | 32 | 25 |
| Thiophenol | 8 | 0 | 0 | 0 | 0 | 0 |
| C3-Thiophenes | 26 | 15 | 12 | 12 | 10 | 27 |
| MethylThiophenol | 20 | 0 | 0 | 0 | 0 | 0 |
| C4-Thiophenes | 31 | 3 | 4 | 0 | 0 | 0 |
| BenzoThiophene | 64 | 47 | 50 | 47 | 44 | 46 |
| Light Cut Sulfur | 127 | 67 | 69 | 69 | 67 | 64 |
| Heavy Cut Sulfur | 57 | 18 | 16 | 12 | 10 | 27 |
| Cut Gasoline Sulfur (thru 428° F.) | 184 | 85 | 86 | 81 | 76 | 91 |
| Total Sulfur (thru 430° F.) | 248 | 132 | 135 | 128 | 121 | 137 |
| % SULFUR REDUCTION | | | | | | |
| Light Cut Sulfur | | 47% | 45% | 46% | 48% | 50% |
| Heavy Cut Sulfur | | 69% | 71% | 79% | 83% | 53% |
| Cut Gasoline Sulfur (thru 428° F.) | | 54% | 53% | 56% | 58% | 51% |
| Total Sulfur (thru 430° F.) | | 47% | 45% | 48% | 51% | 45% |

It is seen that the cut gasoline sulfur reduction started at about 54% from the 1$^{st}$ day and ended up at about 51% in the 5$^{th}$ day. About 94% cut gasoline sulfur reduction activity was retained after 5 days of operation. Compared to the Example 3, only about 56% cut gasoline sulfur reduction was retained after 5 days of operation. This result indicated that a relative improvement of the sulfur reduction activity by ~40%.

During the study, a small catalyst sample was also taken out in each day. For each catalyst sample, the Lewis Acid component 2A and the zeolite-containing catalyst component 5A were separated by sink/float separation. The chemical properties of the catalyst blends and separated Lewis Acid components and zeolite components are listed in Table 13 below. It is seen that in the 5th day about 0.01% Na$_2$O and about 0.4% SiO$_2$ were transferred to the Lewis Acid component from the cracking catalyst. Compared to the Example 3 above, in the 5$^{th}$ day there were about 0.07% Na$_2$O and about 1.4% silica transfer to the Lewis Acid additive. These results again indicate that lower Na$_2$O and SiO$_2$ transfer from the catalyst 5A helped to preserve sulfur reduction activity of the Lewis Acid containing additive.

TABLE 13

|  | 1 Day | 2 Days | 3 Days | 4 Days | 5 Days |
|---|---|---|---|---|---|
| Separated Lewis Acid Components |  |  |  |  |  |
|  | Sink | Sink | Sink | Sink | Sink |
|  | 74.5% | 73.7% | 74.5% | 75.0% | 75.2% |
| Al$_2$O$_3$ Wt % | 85.4 | 86.3 | 80.9 | 85.4 | 79.7 |
| SiO$_2$ wt % | 0.8 | 0.6 | 0.7 | 1.0 | 1.2 |
| Na$_2$O wt % | 0.04 | 0.04 | 0.04 | 0.06 | 0.05 |
| ZnO wt % | 9.57 | 9.86 | 8.60 | 9.60 | 8.75 |
| Surface Area m$^2$/g | 77 | 75 | 74 | 77 | 76 |
| ZSA m$^2$/g | 4 | 2 | 2 | 7 | 1 |
| MSA m$^2$/g | 73 | 73 | 72 | 70 | 75 |
| Separated Catalyst Components |  |  |  |  |  |
|  | Float | Float | Float | Float | Float |
|  | 24.5% | 26.3% | 25.5% | 25.0% | 24.8% |
| Al$_2$O$_3$ wt % | 37.8 | 37.9 | 38.3 | 38.1 | 39.7 |
| SiO$_2$ wt % | 50.7 | 50.0 | 48.6 | 49.3 | 47.1 |
| Re$_2$O$_3$ wt % | 13.63 | 12.43 | 13.20 | 13.72 | 13.24 |
| Na$_2$O wt % | 0.22 | 0.20 | 0.16 | 0.17 | 0.14 |
| SO$_4$ wt % | 0.02 | 0.01 | 0.01 | 0.01 | 0.02 |
| V ppm | 650 | 930 | 900 | 860 | 1030 |
| ZnO wt % | 0.28 | 0.28 | 0.32 | 0.26 | 0.44 |
| Surface Area m$^2$/g | 365 | 344 | 371 | 364 | 349 |
| ZSA m$^2$/g | 316 | 296 | 324 | 320 | 299 |
| MSA m$^2$/g | 49 | 48 | 47 | 44 | 50 |

TABLE 14

|  | Typical Range | Feed A | Feed B | Feed C |
|---|---|---|---|---|
| API Gravity @ 60° F. | 15–35 | 26.6 | 23.7 | 25.5 |
| Aniline Point, F. |  | 182 | 176 | 196 |
| Sulfur wt % | 0.01–4 | 1.047 | 0.509 | 0.369 |
| Total Nitrogen wt % | 0.02–0.3 | 0.060 | 0.093 | 0.12 |
| Basic Nitrogen wt % | 0.008–0.1 | 0.0308 | 0.0336 | 0.05 |
| Conradson Carbon wt % | 0–6 | 0.23 | 0.41 | 0.68 |
| K Factor | 11–12.5 | 11.59 | 11.59 | 11.94 |
| Specific Gravity @ 60° F. |  | 0.8949 | 0.912 | 0.9012 |
| Refractive Index |  | 1.5003 | 1.5072 | 1.5026 |
| Average Molecular Weight |  |  | 342 | 406 |
| Aromatic Ring Carbons, Ca wt % |  |  | 20.9 | 18.9 |
| Paraffinic Carbons, Cp, wt % |  |  | 54.8 | 63.6 |
| Naphthenic, Cn, wt % |  |  | 24.3 | 17.4 |
| Distillation, Initial Boiling Point, ° F. |  |  |  |  |
| IBP |  | 358 | 331 | 307 |
| 5 |  | 464 | 507 | 513 |
| 10 | 290–600 | 511 | 566 | 607 |
| 20 |  | 579 | 627 | 691 |
| 30 |  | 626 | 673 | 740 |
| 40 |  | 673 | 711 | 782 |
| 50 | 600–900 | 716 | 747 | 818 |
| 60 |  | 765 | 785 | 859 |
| 70 |  | 804 | 821 | 904 |
| 80 |  | 865 | 874 | 959 |
| 90 | 800–1200 | 937 | 948 | 1034 |
| 95 |  | 1006 | 1022 | 1103 |

What is claimed:

1. A cracking catalyst composition capable of being maintained in a fluidized state within a fluid cracking catalyst unit used in cracking hydrocarbon feedstock containing organic sulfur-containing compounds, the cracking catalyst composition comprising
    (a) zeolite;
    (b) Lewis Acid-containing component; and
    (c) inorganic oxide matrix;
    wherein the cracking catalyst composition further comprises less than 0.20 percent by weight $Na_2O$, and wherein catalyst composition is in the form of a mixture of the Lewis acid component (b) and the zeolite component (a) as separate particulates or, in the form of a composite particulate wherein the inorganic matrix component (c) supports separate particles of Lewis acid component (b) and zeolite component (a).

2. The composition of claim 1 wherein the composition comprises 0.15 percent by weight $Na_2O$ or less.

3. The composition of claim 2 wherein the zeolite is a Y-type zeolite selected from the group consisting of USY, REY, REUSY, CREY, CREUSY and mixtures thereof.

4. The composition of claim 2, wherein the Lewis Acid-containing component (b) comprises alumina and at least one metal selected from the group consisting of Ni, Cu, Zn, Ag, Cd, In, Sn, Hg, Ti, Pb, Bi, B, Mn, Ga and mixtures thereof, wherein said at least one metal is present as an oxide, as a cation or is in its zero valence state.

5. The composition of claim 2 wherein the Lewis Acid-containing component (b) has a metal selected from the group consisting of Zn, Ti, Co, Mo, Fe and mixtures thereof, wherein said metal is present as an oxide, as a cation or is in its zero valence state.

6. The composition of claim 2 wherein the metal of the Lewis Acid-containing component (b) comprises Zn.

7. The composition of claim 1 wherein the composition comprises 0.10 percent by weight $Na_2O$ or less.

8. The composition of claim 1 wherein the zeolite (a) comprises 0.5 percent by weight $Na_2O$ or less.

9. The composition of claim 8 wherein the zeolite is a Y-type zeolite selected from the group consisting of USY, REY, REUSY, CREY, CREUSY and mixtures thereof.

10. The composition of claim 1 wherein the zeolite (a) comprises 0.3 percent by weight $Na_2O$ or less.

11. The composition of claim 10 wherein the zeolite is a Y-type zeolite selected from the group consisting of USY, REY, REUSY, CREY, CREUSY and mixtures thereof.

12. The composition of claim 1 wherein the zeolite (a) comprises 0.1 percent by weight $Na_2O$ or less.

13. The composition of claim 1 wherein the Lewis Acid-containing component (b) comprises 0.1 percent by weight $Na_2O$ or less.

14. The composition of claim 13, wherein the Lewis Acid-containing component (b) comprises alumina and at least one metal selected from the group consisting of Ni, Cu, Zn, Ag, Cd, In, Sn, Hg, Ti, Pb, Bi, B, Mn, Ga and mixtures thereof, wherein said at least one metal is present as an oxide, as a cation or is in its zero valence state.

15. The composition of claim 1 wherein the zeolite is a Y-type zeolite selected from the group consisting of HY, USY, REY, REUSY, CREY, CREUSY, MgUSY, ZnUSY, MnUSY-type zeolites and mixtures thereof.

16. The composition of claim 1 wherein the zeolite is a Y-type zeolite selected from the group consisting of USY, REY, REUSY, CREY, CREUSY and mixtures thereof.

17. The composition of claim 1 wherein the zeolite has an average unit cell size of from about 24.25 to 24.50 Å.

18. The composition of claim 1 wherein the zeolite has an average unit cell size of from about 24.5 to 24.7 Å.

19. The composition of claim 1 wherein the Lewis Acid-containing component (b) comprises alumina.

20. The composition of claim 19 wherein the metal of the Lewis Acid-containing component (b) further comprises Zn.

21. The composition of claim 19 wherein the alumina has a particle size of from 20 to 150µ and a surface area of from 30 to 400 $m^2/g$.

22. The composition of claim 19 wherein the zeolite (a) further contains rare earth.

23. The composition of claim 1, wherein the Lewis Acid-containing component (b) comprises alumina and at least one metal selected from the group consisting of Ni, Cu, Zn, Ag, Cd, In, Sn, Hg, Ti, Pb, Bi, B, Mn, Ga and mixtures thereof, wherein said at least one metal is present as an oxide, as a cation or is in its zero valence state.

24. The composition of claim 1 wherein the Lewis Acid-containing component (b) has a metal selected from the group consisting of Zn, Ti, Co, Mo, Fe and mixtures thereof, wherein said metal is present as an oxide, as a cation or is in its zero valence state.

25. The composition of claim 1 wherein the composition comprises at least 3% by weight Lewis Acid-containing component (b).

26. The composition of claim 25 wherein the Lewis Acid-containing component (b) is a Lewis Acid metal cation exchanged on zeolite (a).

27. The composition of claim 1 wherein the composition comprises from about 3 to about 75 weight percent of component (b).

28. The composition of claim 27 wherein zeolite (a) is a Y-type zeolite having a sodium content of 0.3% by weight $Na_2O$ or less, and the composition has a kinetic conversion activity of at least about 2.

29. The composition of claim 1 wherein the composition comprises 30 to 75 weight percent of component (b).

30. The composition of claim 1 wherein the composition comprises a blend of least two separate particulates, one particulate comprising zeolite (a) and inorganic oxide matrix (c) and the other particulate comprising Lewis Acid-containing component (b).

31. The composition of claim 30 wherein the Lewis Acid-containing component (b) comprises alumina and at least one metal selected from the group consisting of Ni, Cu, Zn, Ag, Cd, In, Sn, Hg, Ti, Ph, Bi, B, Mn, Ga and mixtures thereof, wherein said at least one metal is present as an oxide, as a cation or is in its zero valence state.

32. The composition according to claim 31 wherein the composition comprises 0.15% by weight $Na_2O$ or less.

33. The composition according to claim 31 wherein the zeolite (a) comprises 0.3% by weight $Na_2O$ or less.

34. The composition according to claim 31 wherein the Lewis Acid-containing component comprises 0.10% by weight $Na_2O$ or less.

35. The composition according to claim 33 wherein the composition comprises 0.15% by weight $Na_2O$ or less.

36. The composition of claim 31 further comprising vanadium.

37. The composition of claim 30 wherein Lewis Acid-containing component (b) comprises alumina and Zn, wherein said Zn is present as an oxide or is in its zero valence state.

38. The composition of claim 30 wherein the composition has a kinetic conversion activity of at least about 2.

39. The composition of claim 31 wherein the composition has a kinetic conversion activity of at least about 2.

40. The composition of claim 30 further comprising vanadium.

41. The composition of claim 1 further comprising vanadium.

42. The composition of claim 1 where in the average particle size of the composition is in the range of 60 to 90 microns.

43. An improved process for catalytic cracking of hydrocarbon feedstock which contains organic sulfur compounds comprising contacting in a catalytic cracking reactor of a fluid catalyst cracking unit an inventory of fluid cracking catalyst composition, removing the liquid and gaseous product streams from said reactor, transferring a portion of the inventory to regenerators of said unit to remove contaminants before returning same to the reactor, removing a portion of the inventory from the unit while replacing same with fresh catalyst composition to provide an equilibrium state of said inventory, the improvement comprising (1) adding to the inventory of fluid cracking catalyst composition in the unit a fresh cracking catalyst composition according to claim 1, and (2) recovering a liquid product having a boiling point of up to about 220° C., said liquid product having a sulfur content that is at least 15 weight percent lower than that attained by a composition composed of the same zeolite catalyst without Lewis Acid-containing component (b).

44. An improved process according to claim 43 wherein the fresh cracking catalyst composition comprises a catalyst according to claim 2.

45. An improved process according to claim 44 wherein said liquid product has a sulfur content that is at least 20% percent lower than that attained by a composition composed of the same zeolite catalyst without Lewis Acid-containing component (b).

46. A method of reducing sulfur in gasoline originating from a naphtha stream generated by a fluidized catalytic cracking (FCC) unit having a reaction stage and a regeneration stage process, the method comprising:
   (a) preparing a cracking catalyst composition according to claim 1;
   (b) adding the catalyst composition to a catalyst inventory of the FCC unit;
   (c) introducing the catalyst composition to the reaction stage of the FCC unit in amounts sufficient to convert hydrocarbon feed entering the reaction stage of the FCC unit into hydrocarbon products having a sulfur content of at least 15% less than that produced when using a catalyst, composition without said Lewis Acid-containing component; and
   (d) recycling the catalyst inventory from (c) to the regeneration stage of the FCC unit to remove coke from the catalyst inventory.

47. A method according to claim 46 wherein the cracking catalyst composition comprises a metal selected from the group consisting of Zn, Ti, Co, Mo, Fe, and mixtures thereof, wherein said metal is present as an oxide, as a cation or is in its zero valence state.

48. A method according to claim 47 wherein the metal is Zn.

49. A method according to claim 46 wherein the Lewis Acid component comprises alumina.

50. A method for making a cracking catalyst composition capable of being maintained within a fluid cracking catalyst unit used in cracking hydrocarbon feedstock, the method for making the catalyst comprising:
   (a) selecting a zeolite comprising about 0.5 percent by weight $Na_2O$ or less,
   (b) selecting a Lewis Acid-containing component comprising about 0.1 percent $Na_2O$ or less, and
   (c) combining said zeolite and Lewis Acid-containing component in proportions sufficient to produce a catalyst composition according to claim 1.

51. The method of claim 50 wherein the catalyst composition produced in (c) comprises 0.15 percent by weight $Na_2O$ or less.

52. The method of claim 51 wherein the zeolite selected in (a) is a Y-type zeolite selected from the group consisting of USY, REY, REUSY, CREY, CREUSY and mixtures thereof.

53. The method of claim 50 wherein the catalyst composition produced in (c) comprises 0.10 percent by weight $Na_2O$ or less.

54. The method of claim 53 wherein the zeolite selected in (a) is a Y-type zeolite selected from the group consisting of USY, REY, REUSY, CREY, CREUSY and mixtures thereof.

55. The method of claim 53, wherein the Lewis Acid-containing component selected in (b) comprises alumina and at least one metal selected from the group consisting of Ni, Cu, Zn, Ag, Cd, In, Sn, Hg, Ti, Pb, Si, B, Mn, Ga and mixtures thereof, wherein said at least one metal is present as an oxide, as a cation or is in its zero valence state.

56. The method of claim 53 wherein the Lewis Acid-containing component selected in (b) comprises a metal selected from the group consisting of Zn, Ti, Co, Mo, Fe and mixtures thereof, wherein said metal is present as an oxide, as a cation or is in its zero valence state.

57. The method of claim 50 wherein the zeolite selected in (a) comprises 0.3 percent by weight $Na_2O$ or less.

58. The method of claim 57 wherein the zeolite selected in (a) is a Y-type zeolite selected from the group consisting of USY, REY, REUSY, CREY, CREUSY and mixtures thereof.

59. The method of claim 50 wherein the zeolite selected in (a) comprises 0.1 percent by weight $Na_2O$ or less.

60. The method of claim 59 wherein the zeolite selected in (a) is a Y-type zeolite selected from the group consisting of USY, REY, REUSY, CREY, CREUSY and mixtures thereof.

61. The method of claim 50 wherein the zeolite selected in (a) is a Y-type zeolite selected from the group consisting of HY, USY, REY, REUSY, CREY, CREUSY, MgUSY, ZnUSY, MnUSY-type zeolites and mixtures thereof.

62. The method of claim 50 wherein the zeolite selected in (a) is a Y-type zeolite selected from the group consisting of USY, REY, REUSY, CREY, CREUSY and mixtures thereof.

63. The method of claim 50, wherein the Lewis Acid-containing component selected in (b) comprises alumina and at least one metal selected from the group consisting of Ni, Cu, Zn, Ag, Cd, In, Sn, Hg, Ti, Pb, Bi, B, Mn, Ga and mixtures thereof, wherein said at least one metal is present as an oxide, as a cation or is in its zero valence state.

64. The method of claim 50 wherein the Lewis Acid-containing component selected in (b) comprises a metal selected from the group consisting of Zn, Ti, Co, Mo, Fe and mixtures thereof, wherein said metal is present as an oxide, as a cation or is in its zero valence state.

65. The method of claim 50, wherein the catalyst composition produced in (c) comprises at least about 3% by weight of Lewis Acid-containing component selected in (b).

66. The method of claim 65 wherein the Lewis Acid-containing component is a metal cation produced during an exchange reaction with the zeolite.

67. The method of claim 65 wherein zeolite selected in (a) is a Y-type zeolite having a sodium content of 0.3% by weight $Na_2O$ or less, and the catalyst composition produced in (c) has a kinetic conversion activity of at least about 2.

68. The method of claim 50 wherein the catalyst composition produced in (c) comprises from about 3 to about 75 weight percent of Lewis Acid-containing component selected in (b).

69. The method of claim 50 wherein the catalyst composition produced in (c) comprises 30 to 75 weight percent of Lewis Acid-containing component selected in (b).

* * * * *